(12) United States Patent
Broda et al.

(10) Patent No.: US 12,043,416 B2
(45) Date of Patent: Jul. 23, 2024

(54) SATELLITE WITH DEPLOYABLE OPTICAL ASSEMBLY

(71) Applicant: Wyvern Incorporated, Edmonton (CA)

(72) Inventors: Kurtis Broda, Calgary (CA); Kristen Cote, Toronto (CA); Vincent Sauer, Edmonton (CA); Callie Lissinna, Edmonton (CA); Christopher Robson, Edmonton (CA)

(73) Assignee: Wyvern Incorporated, Edmonton (CA)

( * ) Notice: Subject to any disclaimer, the term of this patent is extended or adjusted under 35 U.S.C. 154(b) by 0 days.

(21) Appl. No.: 17/764,654

(22) PCT Filed: Nov. 26, 2021

(86) PCT No.: PCT/CA2021/051697
§ 371 (c)(1),
(2) Date: Mar. 29, 2022

(87) PCT Pub. No.: WO2022/109747
PCT Pub. Date: Jun. 2, 2022

(65) Prior Publication Data
US 2023/0339626 A1    Oct. 26, 2023

Related U.S. Application Data

(60) Provisional application No. 63/118,696, filed on Nov. 26, 2020.

(51) Int. Cl.
*B64G 1/22* (2006.01)
*B64G 1/10* (2006.01)
*G02B 23/02* (2006.01)

(52) U.S. Cl.
CPC ........... *B64G 1/222* (2013.01); *B64G 1/1028* (2023.08); *G02B 23/02* (2013.01)

(58) Field of Classification Search
CPC .... B64G 1/222; B64G 1/1028; B64G 1/1057; G02B 23/02
See application file for complete search history.

(56) References Cited

U.S. PATENT DOCUMENTS

| | | | |
|---|---|---|---|
| 3,174,397 A | 3/1965 | Sanborn | |
| 4,819,399 A | 4/1989 | Onoda | |

(Continued)

FOREIGN PATENT DOCUMENTS

| | | | |
|---|---|---|---|
| CN | 1598638 A | 3/2005 | |
| CN | 101236288 A | 8/2008 | |

(Continued)

OTHER PUBLICATIONS

Adamowski "Polish space startup puts first nanosats into orbit, eyes satellite constellation and production facility" SpaceNews, Jul. 2019 <https://spacenews.com/polish-space-startup-puts-first-nanosats-into-orbit-eyes-satellite-constellation-and-production-facility/>.

(Continued)

*Primary Examiner* — Rodney A Bonnette
(74) *Attorney, Agent, or Firm* — BERESKIN & PARR LLP/S.E.N.C.R.L. s.r.l; Isis E. Caulder; Ray Kovarik

(57) ABSTRACT

A satellite with deployable optics is provided. The satellite has a frame, an optical axis, and a deployable optical system. The optical system has a mechanical aperture perpendicular to the optical axis, where light collected travels substantially parallel to the optical axis. The optical system has a stored configuration in which it remains within the frame and a deployed configuration in which it extends outside the frame. In some configurations, the light-collecting area of the deployed configuration is larger than the possible light-collecting area of the stored configuration. In a partially deployed configuration, all of the primary mirror segments remain substantially within the frame, and the light-collecting area is smaller than that in the deployed configuration.

(Continued)

A method of using the satellite includes setting the satellite to the deployed configuration, detecting whether there is a deployment malfunction, and, if so, setting the satellite to a partially deployed configuration.

20 Claims, 14 Drawing Sheets

(56) References Cited

U.S. PATENT DOCUMENTS

| | | | |
|---|---|---|---|
| 5,898,529 | A | 4/1999 | Meyer et al. |
| 6,191,757 | B1 | 2/2001 | Bassily et al. |
| 6,308,919 | B1* | 10/2001 | Palmer ............... H01Q 1/288 244/172.6 |
| 6,683,311 | B1 | 1/2004 | Wuest |
| 6,734,966 | B2 | 5/2004 | Mccarthy |
| 7,346,281 | B2 | 3/2008 | Wilcken et al. |
| 7,782,530 | B1 | 8/2010 | Krumel et al. |
| 8,947,777 | B2 | 2/2015 | Newswander et al. |
| 10,241,293 | B2 | 3/2019 | Reid et al. |
| 2002/0145082 | A1* | 10/2002 | Bertheux ............... B64G 1/503 244/172.6 |
| 2011/0240801 | A1 | 10/2011 | Manzoni |
| 2012/0267482 | A1 | 10/2012 | Baudasse et al. |
| 2013/0229709 | A1* | 9/2013 | Newswander ....... H04B 10/118 359/399 |
| 2015/0146288 | A1* | 5/2015 | Newswander ........ B64G 1/222 359/399 |
| 2016/0352022 | A1* | 12/2016 | Thomson ............... H01Q 1/288 |
| 2018/0106981 | A1* | 4/2018 | Reid .................... G02B 7/1827 |
| 2018/0290768 | A1* | 10/2018 | Faye ..................... G02B 23/16 |

FOREIGN PATENT DOCUMENTS

| | | |
|---|---|---|
| CN | 104317044 A | 1/2015 |
| EP | 1391766 B1 | 6/2006 |
| KR | 101428789 B1 | 8/2014 |

OTHER PUBLICATIONS

SatRevolution "SatRevolution REC Constellation for Agriculture", accessed Sep. 15, 2020 <https://web.archive.org/web/20200915152141/https://satrevolution.com/company/news/satrevolution-rec-constellation-for-agriculture/>.

SatRevolution "Real-time Earth-observation Constellation", accessed Sep. 15, 2020 <https://web.archive.org/web/20200915140415/https://satrevolution.com/products/rec/>.

NASA "2013 CIF Winner details" accessed Jul. 2020 <https://www.nasa.gov/ames-cct/cif/cif-archive/2013-cif-winners/>.

Villafranca et al., "Limitations of Hyperspectal Earth Observation on Small Satellites" Journal of Small Satellites 1.1 (2012): pp. 19-29.

Lee et al., "CubeSat Design Specification" California Polytechnic State Univ., San Luis Obispo (2014).

Dolkens & Kuiper "A deployable telescope for submeter resolutions from microsatellite platforms" International Conference of Space Optics—IICSO 2014. vol. 10563 (2014).

Karmin et al., "Cubesat Mission for Multispectral Earth Observation From Low Earth Orbit" 10th International DAAAM Baltic Conference, May 2015, pp. 1-6.

Stiles et al., "Development of Deployable Aperture Concepts for CubeSats" 51st AIAA SSDM Conference, 2010, pp. 1-10.

Champagne et al. CubeSat Image Resolution Capabilities with Deployable Optics and Current Imaging Technology, (2014) SBC14-VII-2 28th Annual AIAA Conf. on Small Satellites.

Sheng et al., "Bathymetry Retrieval from Hyperspectral Remote Sensing Data in Optical-Shallow Water" (2014). Geoscience and Remote Sensing, IEEE Transactions on. 52. 1205-1212. 10.1109/TGRS.2013.2248372.

Aguado-Aglet et al., "Nanosatellites: Space and Ground Technologies, Operations and Economics" Mar. 2020, p. 380.

International Preliminary Report on Patentability and Written Opinion mailed Jun. 8, 2023 in International Patent Application No. PCT/CA2021/051697 (7 pages).

EoPortal InflateSail Sep. 23, 2014 <https://www.eoportal.org/satellite-missions/inflatesail#references>.

Extended European Search Report dated Apr. 19, 2024 in European Patent Application No. 21896017.7 (9 pages).

* cited by examiner

SATELLITE WITH DEPLOYABLE OPTICAL ASSEMBLY

FIELD

Various embodiments are described herein that generally relate to a satellite with a deployable optical assembly for imaging and methods of use thereof.

BACKGROUND

The following paragraphs are provided by way of background to the present disclosure. They are not, however, an admission that anything discussed therein is prior art or part of the knowledge of persons skilled in the art.

Typical Earth imaging systems are large, as the area of the aperture (or primary mirror) affects both the diffraction limited spatial resolution on the ground (Wertz et al., *Space mission engineering: the new SMAD*, Vol. 1. Hawthorne, CA: Microcosm Press (2011)) along with the amount of total signal collected. As the ground sample distance (GSD) is decreased, less light is collected from the relevant area and hence the signal-to-noise ratio (SNR) decreases. Therefore, maximizing aperture diameter and light-collecting area is an important design consideration.

A standard Cassegrain telescope design has a large amount of unused volume between the primary and secondary mirrors. This means that the volume of the satellite must increase if a higher-resolution telescope is desired. It is undesirable to utilize volume inside of a satellite for the space between primary and secondary mirrors, as other components could be placed in this volume that must otherwise be kept vacant.

Typical large aperture systems require a large and costly satellite bus. CubeSats are widely used for Earth imaging applications because they provide lower-cost and schedule improvements over traditional satellites. However, their small size typically limits the available light-collecting area, and therefore limits GSD and SNR. If an optical system can, however, be designed with increased light-collecting area compared to payloads typical of CubeSats, a better GSD and SNR can be achieved at a reduced capital cost (compared to larger satellites).

There is a need for a smaller and standardized satellite which provides a larger aperture, and less unused volume.

SUMMARY OF VARIOUS EMBODIMENTS

Various embodiments of a satellite with a deployable optical assembly and methods of use thereof are provided according to the teachings herein.

According to one aspect of the invention, there is disclosed a satellite, comprising: a frame comprising a fixed, substantially rectangular cross-section; a longitudinal length, extending along a longitudinal axis, substantially perpendicular to the rectangular cross-section, wherein the longitudinal length is larger than the largest dimension of the rectangular cross-section; and an optical axis, substantially perpendicular to the longitudinal axis; and a deployable optical system, having a mechanical aperture perpendicular to the optical axis, wherein light collected enters the optical system substantially parallel to the optical axis, the deployable optical system having a deployed configuration and a stored configuration wherein: in the stored configuration, the optical system remains substantially within the frame; and in the deployed configuration, portions of the optical system extend substantially outside the frame.

In at least one embodiment, the frame comprises a plurality of CubeSat units.

In at least one embodiment, the satellite may be varied from the stored configuration to the deployed configuration while the satellite is in orbit.

In at least one embodiment, the deployed configuration has a light-collecting area, and the light-collecting area of the deployed configuration is larger than the possible light-collecting area of the stored configuration.

In at least one embodiment, the optical assembly further comprises a primary mirror and secondary mirror, wherein the primary mirror comprises a plurality of primary mirror segments.

In at least one embodiment, the optical assembly comprises a catadioptric telescope.

In at least one embodiment, the primary mirror segments further comprise a primary mirror reflecting surface and micro-adjustment mechanism, the micro-adjustment mechanism configured such that the primary mirror reflecting surface may be finely varied in position relative to the frame.

In at least one embodiment, at least one primary mirror segment is fixed in position, such that when the satellite is varied between the stored configuration and deployed configuration, a position of at least one primary mirror segment remains constant relative to the frame.

In at least one embodiment, in the stored configuration, the primary mirror segments and the secondary mirror remain substantially within the frame, and in the deployed configuration, at least one primary mirror segment is varied in position to extend away from the frame, and the secondary mirror is actuated to extend away from the frame along the length of the optical axis.

In at least one embodiment, the optical system further has a partially deployed configuration, wherein all of the primary mirror segments remain substantially within the frame, and the secondary mirror is actuated to extend away from the frame along the optical axis, wherein the light-collecting area of the satellite in the partially deployed configuration is smaller than the light-collecting area of the satellite in the deployed configuration.

In at least one embodiment, the light-collecting area of the satellite in the partially deployed configuration comprises the area of the primary mirror segments that are fixed in position.

In at least one embodiment, the satellite may be varied from the stored configuration to the partially deployed configuration while the satellite is in orbit.

In at least one embodiment, the light-collecting area of the satellite in the deployed configuration is at least 240 square centimeters.

In at least one embodiment, the ground sample distance of the optical assembly is at most 3 meters at an optical wavelength of 1100 nm and an orbiting altitude of 550 kilometers.

In at least one embodiment, the primary mirror comprises four primary mirror segments, wherein a first two primary mirror segments are fixed and a second two primary mirror segments are deployable, wherein the deployable mirror segments are coupled to the frame so as to have only one rotational degree of freedom.

In at least one embodiment, the secondary mirror is coupled to the frame such that in the stored configuration, the secondary mirror is retracted behind the mechanical aperture, and in the deployed configuration, the secondary mirror is extended away from the frame along the optical axis.

According to another aspect of the invention, there is disclosed a method of configuring a satellite with deployable optics, the method comprising the steps of: providing the satellite with deployable optics in the stored configuration; and while the satellite is in orbit, setting the satellite to the deployed configuration.

In at least one embodiment, the setting of the satellite in the deployed configuration results in a functional optical system with a light-collecting area larger than the possible light-collecting area of the satellite in the stored configuration.

In at least one embodiment, the method further comprises adjusting a deployed secondary mirror in relation to a primary mirror to align the optical system.

In at least one embodiment, the method of configuring the satellite with deployable optics is performed on a satellite having a frame that comprises a plurality of CubeSat units.

In at least one embodiment, the method further comprises: detecting a deployment malfunction; and setting the satellite to a partially deployed configuration, wherein the optical system partially deploys, such that the optical system has a light-collecting area smaller than the deployed light-collecting area.

According to another aspect of the invention, there is disclosed a method of configuring a satellite with deployable optics, the method comprising the steps of: providing the satellite with deployable optics in the stored configuration; while the satellite is in orbit, setting the satellite to a partially deployed configuration, such that a secondary mirror is deployed and aligned to fixed primary petals to create a functioning optical system; and fully deploying the system by deploying additional primary petals, such that the functioning optical system has an increased light-collecting area.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

Figure 1:
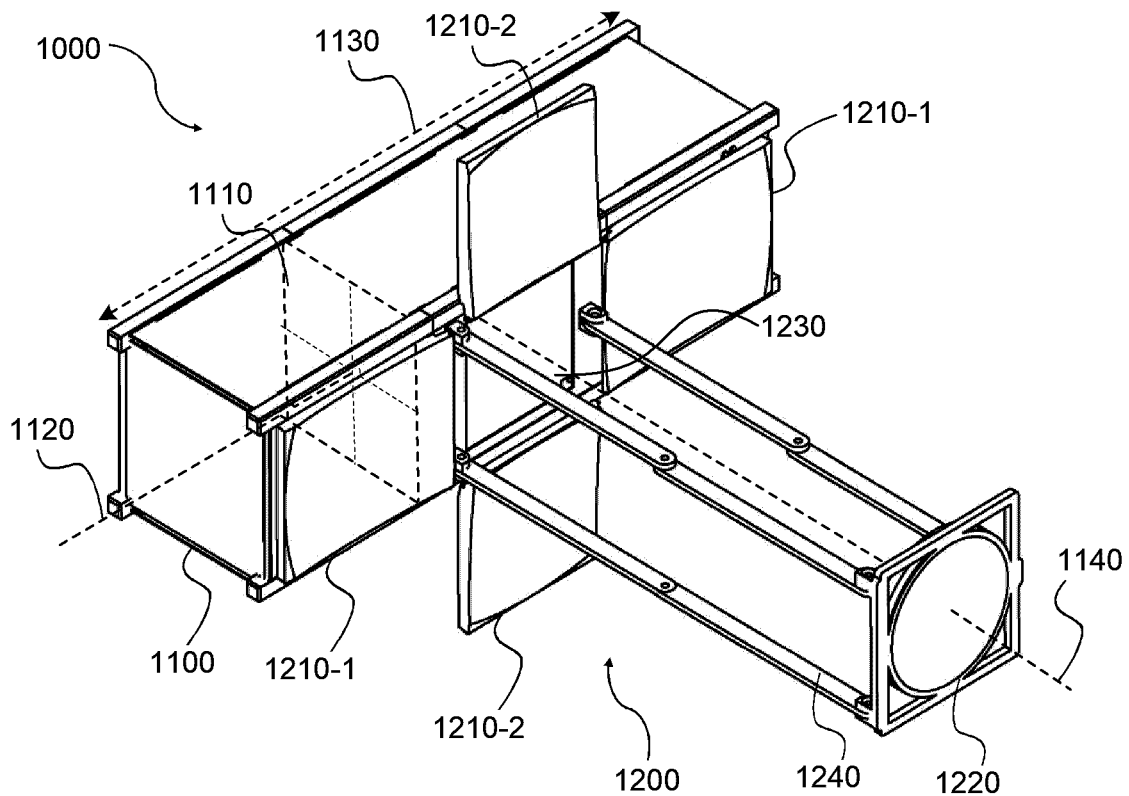
FIG. 1 illustrates a perspective view of an embodiment of a satellite with deployable optics, in the fully deployed configuration.

Further aspects and features of the example embodiments described herein will appear from the following description taken together with the accompanying drawings.

DETAILED DESCRIPTION OF THE EMBODIMENTS

Various embodiments in accordance with the teachings herein will be described below to provide an example of at least one embodiment of the claimed subject matter. No embodiment described herein limits any claimed subject matter. The claimed subject matter is not limited to devices, systems, or methods having all of the features of any one of the devices, systems, or methods described below or to features common to multiple or all of the devices, systems, or methods described herein. It is possible that there may be a device, system, or method described herein that is not an embodiment of any claimed subject matter. Any subject matter that is described herein that is not claimed in this document may be the subject matter of another protective instrument, for example, a continuing patent application, and the applicants, inventors, or owners do not intend to abandon, disclaim, or dedicate to the public any such subject matter by its disclosure in this document.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments described herein. Also, the description is not to be considered as limiting the scope of the embodiments described herein.

It should also be noted that the terms "coupled" or "coupling" as used herein can have several different meanings depending on the context in which these terms are used. For example, the terms coupled or coupling can have a mechanical or electrical connotation. For example, as used herein, the terms coupled or coupling can indicate that two elements or devices can be directly connected to one another or connected to one another through one or more intermediate elements or devices via an electrical signal, electrical connection, or a mechanical element depending on the particular context.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5%, or 10%, for example, if this deviation does not negate the meaning of the term it modifies.

Furthermore, the recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

It should also be noted that the use of the term "window" in conjunction with describing the operation of any system or method described herein is meant to be understood as describing a user interface for performing initialization, configuration, or other user operations.

The example embodiments of the devices, systems, or methods described in accordance with the teachings herein may be implemented as a combination of hardware and software. For example, the embodiments described herein may be implemented, at least in part, by using one or more computer programs, executing on one or more programmable devices comprising at least one processing element and at least one storage element (i.e., at least one volatile memory element and at least one non-volatile memory element). The hardware may comprise input devices including at least one of a touch screen, a keyboard, a mouse, buttons, keys, sliders, and the like, as well as one or more of a display, a printer, and the like depending on the implementation of the hardware.

It should also be noted that there may be some elements that are used to implement at least part of the embodiments described herein that may be implemented via software that is written in a high-level procedural language such as object-oriented programming. The program code may be written in C++, C#, JavaScript, Python, or any other suitable programming language and may comprise modules or classes, as is known to those skilled in object-oriented programming. Alternatively, or in addition thereto, some of these elements implemented via software may be written in assembly language, machine language, or firmware as needed. In either case, the language may be a compiled or interpreted language.

At least some of these software programs may be stored on a computer readable medium such as, but not limited to, a read-only memory device, a magnetic disk, an optical disc, a USB key, and the like that is readable by a device having a processor, an operating system, and the associated hardware and software that is necessary to implement the functionality of at least one of the embodiments described herein. The software program code, when read by the device, configures the device to operate in a new, specific, and predefined manner (e.g., as a specific-purpose computer) in order to perform at least one of the methods described herein.

At least some of the programs associated with the devices, systems, and methods of the embodiments described herein may be capable of being distributed in a computer program product comprising a computer readable medium that bears computer usable instructions, such as program code, for one or more processing units. The medium may be provided in various forms, including non-transitory forms such as, but not limited to, one or more diskettes, compact disks, tapes, chips, and magnetic and electronic storage. In alternative embodiments, the medium may be transitory in nature such as, but not limited to, wire-line transmissions, satellite transmissions, internet transmissions (e.g., downloads), media, digital and analog signals, and the like. The computer useable instructions may also be in various formats, including compiled and non-compiled code.

In accordance with the teachings herein, there are provided various embodiments for a satellite with a deployable optical assembly.

Figure 2:
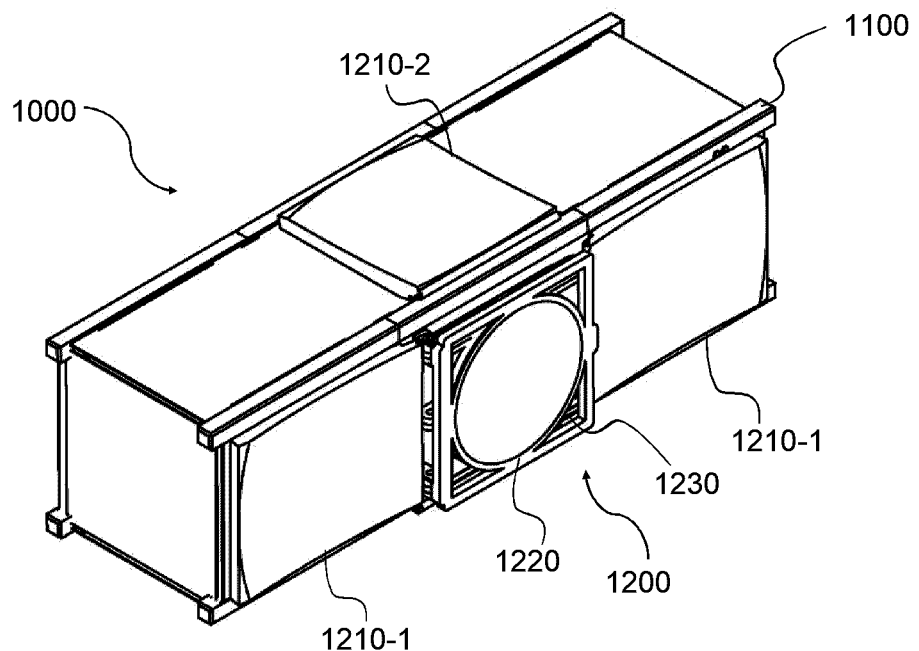
FIG. 2 illustrates a perspective view of the embodiment of FIG. 1 in the stored configuration.

Referring now to FIGS. 1 and 2, shown therein is an embodiment of a satellite 1000 with a deployable optical system, in the deployed and stored configuration, respectively. The satellite comprises a frame 1100. The frame 1100 may be constructed from aluminum alloy or any other material known in the art suitable for the construction of satellite structures.

The frame 1100 comprises a rectangular cross section 1110. In the embodiment of FIGS. 1 and 2, the rectangular cross section 1110 is substantially square, such that the length and width of the rectangular cross section are substantially equal. In other embodiments, the length and width of rectangular cross section 1110 may differ substantially. For example, the height of cross section 1110 may be twice as large as the width of rectangular cross section 1110.

Perpendicular to the rectangular cross section 1110 is a longitudinal axis 1120. Extending along the longitudinal axis 1120, perpendicular to the rectangular cross section 1110, is a longitudinal length 1130. The longitudinal length 1130 is longer than the greatest possible dimension of the rectangular cross section 1110. In the embodiment of FIGS. 1-2, the longitudinal length is approximately three times the length of the width and height of the rectangular cross section 1110. For example, the longitudinal length is approximately 30 cm, while the rectangular cross section has approximate dimensions of 10 cm×10 cm.

The frame 1100 of the satellite 1000 may be approximately described as a rectangular prism, wherein the rectangular cross section 1110 is extruded along the longitudinal length 1130. The roughly rectangular prism form has six faces, a pair of cross-sectional faces, and two pairs of longitudinal faces. In embodiments with square rectangular cross sections 1110, the two pairs of longitudinal faces are identical in size and shape, such that there are four identical longitudinal faces.

In some embodiments, the frame 1100 may be constructed from multiple CubeSat units. In the embodiment of FIGS. 1-2, the frame is constructed from three CubeSat units, forming a 3U CubeSat configuration. The three CubeSat units are configured such that the three units are substantially aligned along a single axis, forming an external volume with dimensions of approximately 10 cm×10 cm×30 cm.

In other embodiments, a greater or lesser number of CubeSat units may be used to form the frame 1100 of the satellite 1000. For example, two CubeSat units may be assembled to form a 2U configuration with approximate external dimensions of 10 cm×10 cm×20 cm. In other embodiments, six CubeSat units may be assembled, forming a 6U CubeSat configuration with approximate external dimensions of 10 cm×20 cm×30 cm. In other embodiments, any other operational configuration of CubeSat units may be assembled to form the frame 1100.

The frame 1100 further comprises an optical axis 1140. The optical axis 1140 is substantially perpendicular to the longitudinal length 1130 and the longitudinal axis 1120, and substantially parallel to the rectangular cross section 1110. The frame 1100 may be approximately described as a rectangular prism. An axis perpendicular to the longitudinal axis 1120 may intersect with four substantially planar longitudinal faces of the frame 1100. In the embodiment of FIGS. 1-2, the optical axis 1140 intersects two planar longitudinal faces of the volume of the frame 1100 such that the optical axis 1140 is perpendicular to both of the two planar faces intersected.

The satellite 1000 further comprises an optical system 1200. The optical system 1200 is defined as encompassing all mechanical and optical components related to the optical imaging capabilities of the satellite 1000.

The optical system 1200 comprises a mechanical aperture 1230. The mechanical aperture 1230 is an opening in the frame 1100, perpendicular to the optical axis 1140. In the embodiment of FIGS. 1-2, the mechanical aperture 1230 is relatively square in shape, with approximate dimensions of 8 cm×8 cm. In other embodiments, the mechanical aperture may differ in shape and dimensions.

The optical system 1200 of the satellite 1000 is arranged such that there are two possible configurations of the optical system 1200. The configurations include a stored configuration and deployed configuration. The satellite 1000 in the deployed configuration is shown in FIG. 1. The satellite 1000 in the stored configuration is shown in FIG. 2.

Referring again to the embodiment of FIGS. 1-2, the optical system 1200 of the satellite 1000 further comprises primary mirror segments 1210 and a secondary mirror 1220. The optical system may be a catadioptric optical system, comprising a modified Cassegrain telescope with additional refracting optics. The satellite 1000 comprises four primary mirror segments 1210 and a secondary mirror 1220.

When in operation, light is collected by the primary mirror segments 1210, then focused and directed towards the secondary mirror 1220, which further focuses and directs collected light towards the mechanical aperture 1230, along the optical axis 1140.

In some embodiments, additional optical components may exist within the mechanical aperture 1230. For example, additional refractive optics such as sub-aperture correctors may be present inside the mechanical aperture.

These sub-aperture correctors work to reduce the optical errors or aberrations attributable to the structure of the primary mirror segments 1210 and/or secondary mirror 1220. The entire optical system 1200 may focus collected light onto an imaging plane. At this imaging plane, an optical recording medium may be present. This may include a CMOS sensor, CCD sensor, photosensitive film, or any other component known in the art that allows for the collection of image signals. Examples of optical recording media include IMEC LS150 CMOS sensor and AMS CMV2000 CMOS sensor.

In the stored configuration of FIG. 2, the components of the optical system 1200 are positioned such that they are largely within the frame 1100 of the satellite 1000. For example, the primary mirror segments 1210 are largely within the volume of the frame 1100. The secondary mirror 1220 is retracted into the frame 1100. Mechanical components associated with the secondary mirror 1220 are additionally retracted into the volume of the frame 1100.

In the stored configuration, components of the optical system 1200 may extend marginally outside the volume of the frame 1100. For example, in the embodiment of FIGS. 1-2, the primary mirror segments 1210 may extend outside the volume of the frame 1100 by up to 6 mm according to the CubeSat standard.

In the deployed configuration of FIG. 1, the components of the optical system 1200 are positioned such that many extend substantially outside of the volume defined by the frame 1100. For example, the primary mirror segments 1210-2 are rotationally actuated from their stored position as shown in FIG. 2, to their deployed position, as shown in FIG. 1. The secondary mirror 1220 is actuated by a secondary mirror deployment mechanism 1240, such that it extends away from the frame 1100, substantially along the optical axis 1140.

In the embodiment of FIGS. 1-2, the deployable primary mirror segments 1210-2 are coupled to the frame 1100 such that they have one degree of rotational freedom. During the deployment process, the deployable primary mirror segments 1210-2 and secondary mirror 1220 are released via an electric signal sent to unlock a locking mechanism. Once unlocked, the deployable primary mirror segments 1210-2 and secondary mirror 1220 are actuated by stored mechanical spring energy. In other embodiments, other actuation means may be used, such as pneumatic, hydraulic, electromagnetic, or by any other means known in the art for actuating mechanical components.

Comparing the deployed configuration and stored configuration of the satellite 1000, if one is to define a volume envelope around all components, wherein the volume is as close to the surface of all components as possible without contacting any portions, the stored configuration has a smaller volume envelope than the volume envelope that may be defined around the satellite 1000 in the deployed configuration. The ratio of volumes between the deployed configuration and the stored configuration preferably ranges from 1.5 to 2 for a 3U satellite configuration. In other embodiments with differing CubeSat configurations, this ratio may be higher or lower.

Cassegrain type telescopes require a large amount of unused volume between primary and secondary mirror components. Satellites have limited internal space. Satellite launch vehicles have limited space. The cost to launch a specific satellite may be approximately proportional to the launch vehicle space required. Utilizing internal space of a satellite for purposes that render this space relatively unoccupied is an inefficient allocation of internal space.

In a satellite without a deployable optical system, the volume required for the operation of the optical system must be internal to the overall volume envelope of the satellite. This occupied space that may otherwise be used for other internal components of the satellite.

The embodiment described herein allows the optical components that require a volume of free space to utilize volume outside of the envelope of the frame 1100, allowing for a greater amount of usable volume within the frame 1100 of the satellite 1000. This effectively reduces the required volume for a satellite of specific function and performance. As a result, a satellite of specific optical performance may be lower cost if equipped with a deployable optical system.

Optical performance is proportional to light-collecting area. The satellite arrangement in which optical components may be deployed allows for a larger light-collecting area than a satellite in which optical components are largely fixed in position between launch and operation. The embodiment of FIGS. 1-2 has approximate external dimensions in the stored configuration of 10 cm×10 cm×30 cm. For earth imaging purposes, the maximum light-collecting area possible for this fixed size is approximately 300 cm^2, using the entire area of the largest of the six faces of the roughly rectangular prism shaped satellite. Using the entire face of the satellite 1000 as a light-collecting area is empirically difficult. If the optical system is a modified Cassegrain type telescope, it would be practically impossible, as a portion of the face area must be used to accommodate a secondary mirror. Similarly, if refractive optics are used exclusively, it is unlikely that the entire area may be practically used for light collection.

In contrast, the light-collecting area of the satellite 1000 of the embodiment of FIGS. 1-2 may be defined as approximately the sum of the areas of each primary mirror segment 1210. If each primary mirror segment 1210 is approximately 9 cm×9 cm, the resulting total light-collecting area is approximately 324 cm^2 accounting for the four primary mirror segments 1210, larger than the theoretical maximum light-collecting area of a satellite of the same size with a non-deployable optical system, and much larger than the practical light-collecting area for a satellite of approximately the same size.

In other embodiments, larger, or a greater number of primary mirror segments may be utilized, further increasing light-collecting area, and by extension, optical performance. In other embodiments, smaller or fewer primary mirror segments may be utilized, decreasing light-collecting area and optical performance. For a CubeSat based satellite in a 3U configuration, a minimum light-collecting area of 225 cm^2 may be achieved by using four 75 mm×75 mm primary mirror segments for light collection. For a CubeSat based satellite in a 12U configuration, utilizing the entire 2U×3U face of the satellite as a fixed primary mirror, and an additional two deployable primary mirrors, a maximum light-collecting area of 2100 cm^2 may be achieved. Using the entire area of the face of the 12U configuration CubeSat for light collection is practically difficult. In real world applications, it is likely that the effective maximum light-collecting area would be slightly smaller than 2100 cm^2.

The resolution of an optical system is limited by diffraction. In the diffraction limited case, the resolution can be defined by the Rayleigh criterion. The angular resolution using the Rayleigh criterion for a circular aperture is defined by $\theta = 1.22 (\lambda)/D$ where $\lambda$ is the wavelength of light and $D$ is the aperture diameter. While in orbit, the angular resolution of the optical system can be approximated using the small angle approximation, $\lambda \approx \tan(\theta) \approx GSD/H$, where GSD is the ground sample distance, and H is the orbital altitude. Substituting into the previous equation results in: $GSD \propto (\lambda) H/D$. The ground sample distance will be directly proportional to the wavelength of light used, and the orbital altitude. The GSD will be inversely proportional to the aperture diameter.

In at least one embodiment, the GSD is approximately 2 m at a wavelength of 1100 nm and an orbit altitude of 550 km.

In some embodiments, at least one primary mirror segment 1210 may remain relatively fixed in position. The embodiment of FIGS. 1-2 has two primary mirror segments 1210-1 that are relatively fixed in position. These fixed primary mirror segments 1210-1 generally lie substantially within the volume of the frame 1100.

In some embodiments, the optical system 1200 of the satellite 1000 additionally comprises a partially deployed configuration. The satellite comprises at least one primary mirror 1210-1 that is fixed in position, and at least one primary mirror 1210-2 that is deployable, such that its position relative to the frame may be varied.

Figure 3:
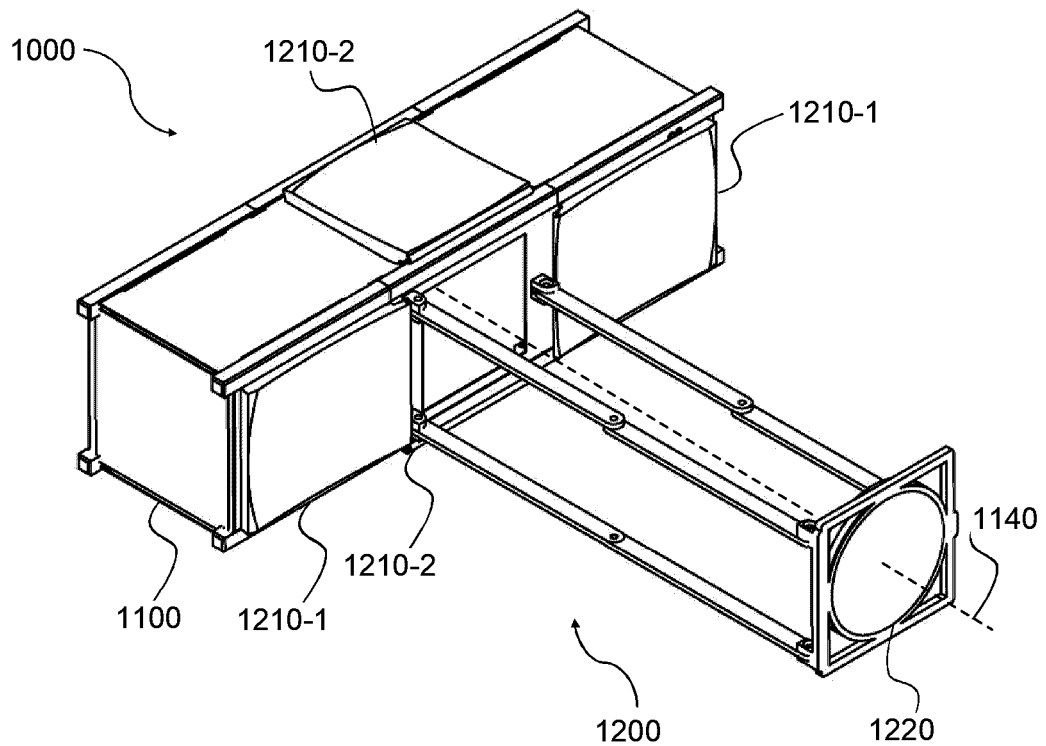
FIG. 3 illustrates a perspective view of the embodiment of FIGS. 1-2 in the partially deployed configuration.

Referring now to FIG. 3, shown therein is the satellite 1000 of the embodiment of FIGS. 1-2 in a partially deployed configuration. The satellite comprises two fixed primary mirror segments 1210-1 and two deployable primary mirror segments 1210-2. Mirrors are in an operational position when they are in a position such that they may effectively collect light and direct it towards the secondary mirror 1220. The fixed primary mirror segments 1210-1 are in an operational position when manufactured and mounted. The deployable primary mirror segments 1210-2 are deployed for them to be in an operational position.

Fixed primary mirror segments 1210-1 provide the additional advantage of reducing the complexity of the control system required to precisely deploy optical components. Deploying only a subset of primary mirror segments 1210-2 reduces complexity, increasing reliability and reducing cost.

In some cases, the deployable primary mirror segments 1210-2 may fail to properly deploy. The satellite 1000 may be alternatively set to a partially deployed configuration as shown in FIG. 3. All primary mirror segments 1210 remain fixed in their original position. The secondary mirror 1220 is actuated from the stored position to the deployed position. The fixed primary mirror segments 1210-1 are in an operational position. The deployable primary mirror segments 1210-2 are not in an operational position. The fixed primary mirror segments 1210-1 collect light, and direct it towards the secondary mirror 1220. The secondary mirror 1220 redirects the light and focuses the light towards the mechanical aperture 1230, the light entering the mechanical aperture 1230 substantially parallel to the optical axis 1140.

The partially deployed configuration only utilizes the fixed primary mirror segments 1210-1 for light collection. Utilizing only the fixed primary mirror segments 1210-1 reduces the light-collecting area of the satellite relative to the deployed configuration, impacting imaging performance. The partially deployed configuration provides a reliability and robustness advantage. The deployed configuration provides the best imaging performance, as it provides the maximum possible light-collecting area. It is desirable to set the satellite 1000 to the deployed configuration, as pictured in FIG. 1. If due to mechanical, electrical, control, communication, or any other system failure, the deployable primary mirror segments 1210-2 do not deploy, the satellite 1000 may be set to the partially deployed configuration. If the satellite 1000 is equipped solely with deployable primary mirror segments 1210-2, a partially deployed configuration is not available.

The performance of the partially deployed configuration is enhanced by the position of the optical axis 1140 perpendicular to the longitudinal axis 1120. For satellites with the optical axis 1140 parallel to the longitudinal axis 1120, the mechanical aperture 1230 would be placed on the face of the frame 1100 that is roughly equal in size to the rectangular cross section 1110. The face approximately equal in area to rectangular cross section 1110 is the face of the frame with the smallest surface area. The secondary mirror 1220 is stored within the mechanical aperture 1230 before deployment. The mechanical aperture 1230 is sufficiently large to accept secondary mirror 1220 for storage. Depending on the size of the optical system 1200 components, a certain size of secondary mirror 1220 is required for sufficient performance. Therefore, there is a theoretical minimum size of the mechanical aperture 1230 required for sufficient optical performance. In the embodiment of FIGS. 1-2, if the optical axis 1140 were parallel to the longitudinal axis 1120, such that the mechanical aperture 1230 were on a face of the frame 1100 parallel to the rectangular cross section 1110, the majority of the area of the face would be dedicated to the mechanical aperture 1230. Only the remainder of the area not dedicated to the mechanical aperture 1230 would be available for the placement of the fixed primary mirror segments 1210-1. The area would not be sufficient for the placement of two fixed primary mirror segments 1210-1 of the same size as the fixed primary mirror segments 1210-1 of the embodiment of FIGS. 1-3. Smaller fixed primary mirror segments 1210 would reduce the light-collecting area of a partially deployed configuration, reducing imaging performance.

Figure 4:
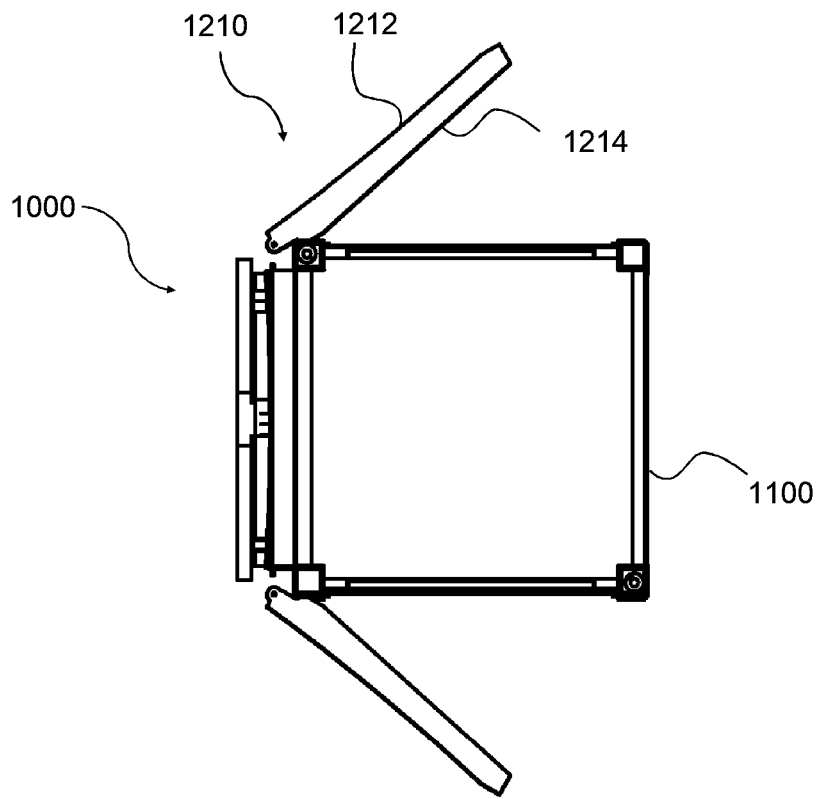
FIG. 4 illustrates a right side detail view of the primary mirror segments of the embodiment of FIGS. 1-3.

Referring now to FIG. 4, shown therein is the embodiment of satellite of FIG. 1-3, part-way through the deployment process of the deployable primary mirror segments 1210-2. In some embodiments, each of the primary mirror segments 1210 may further comprise a primary mirror optical surface 1212 (which may also be referred to as a reflecting surface) and a micro-adjustment mechanism 1214. Due to manufacturing tolerances, stress, and strain during the launch process of the satellite 1000, thermal effects causing elastic mechanical deformations, or other factors, the primary mirror segments 1210 and the secondary mirror 1220 may not be optically aligned and precisely focused after the deployment process. The micro-adjustment mechanism 1214 may be used to slightly vary the position of the primary mirror optical surface 1212. The position of the primary mirror optical surface 1212 may be adjusted both linearly and rotationally. The micro-adjustment mechanism 1214 may be able to adjust the position of the primary mirror optical surface 1212 in three degrees of rotational freedom and three degrees of translational freedom. In some embodiments, fewer degrees of rotational and/or translational freedom may be adjustable by the micro-adjustment mechanism 1214.

Micro-adjustments may differ between fixed and deployable primary mirror segments 1210. For example, the fixed primary mirror segments 1210-1 may comprise a micro-adjustment mechanism 1214 that provides for adjustment along one translational degree of freedom, while the deployable primary mirror segments 1210-2 may comprise a micro-adjustment mechanism 1214 that provides for adjustment along two translational degrees of freedom and two rotational degrees of freedom.

The optical system 1200 of the satellite 1000 may further comprise an adaptive optic system with a changeable component comprising the primary mirror segments 1210.

In some embodiments, an adaptive optics system may be used and may include changeable components within its optical system to correct a distorted wavefront before the wavefront reaches the imaging plane. The system typically measures the wavefront error, or distortion, and then adapts its components to eliminate or minimize the error.

In at least one embodiment, the micro-adjustment mechanism 1214 may be used to align each segment of 1210 with each other so the wavefront error of the combined wavefront reflecting off these surfaces is minimized. This wavefront error is measured and corrected for.

In some cases, it may be desired to have the secondary mirror 1220 of the optical system 1200 of the satellite 1000 deploy prior to the deployable primary mirror segments 1210. In this instance, the secondary mirror 1220 is actuated from the stored position to the deployed position. The fixed primary mirror segments 1210-1 are in an operational position. The deployable primary mirror segments 1210-2 are then actuated into an operational position. The optical system 1200 is then fully deployed.

In some embodiments, the satellite 1000 may further comprise a propulsion means, which may be used to adjust the position of the satellite 1000 while in orbit.

Figure 5:
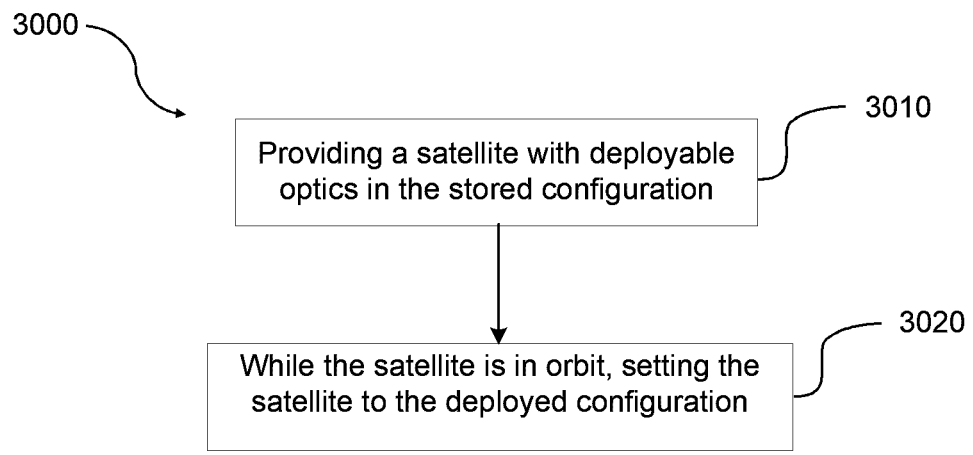
FIG. 5 illustrates a flow chart depicting a method of configuring a satellite with deployable optics.

Referring now to FIG. 5, described therein is a method 3000 of configuring the satellite 1000 with deployable optics. In step 3010, the satellite 1000 is provided in the stored configuration.

In step 3020, while the satellite 1000 is in orbit, the satellite 1000 is set to the deployed configuration, as shown in FIG. 1. The satellite 1000 is placed into orbit while in the stored configuration as shown in FIG. 2. The optical system 1200 components remain substantially within the frame 1100.

Any method of placing the satellite 1000 into orbit known in the art may be used. For example, the satellite 1000 may be placed onto a commercial launch vehicle, which may launch the satellite 1000 into orbit. In the embodiments wherein the frame 1100 is comprised of multiple CubeSat units, any method known in the art for launching CubeSats may be employed.

In some situations, launching methods may require a timeout period between satellite launch and satellite power-up to reduce risk of damage to the launch vehicle. The satellite 1000 may be configured such that satellite power-up is time-delayed from the time of separation from launch vehicle.

Immediately after separating from the launch vehicle, the satellite 1000 may be travelling at an angular velocity of a magnitude too large to initiate the deployment process. A further waiting period may elapse before the next step, allowing the satellite 1000 to slow to the desired orbiting angular velocity, or below an angular velocity threshold that may allow for deployment of the optical system 1200.

Once the satellite 1000 is in its desired orbit, step 3020 may be executed. The satellite 1000 is set to the deployed configuration. The initiation of this step may be conducted automatically. For example, after a time delay as required by the launch process, the satellite 1000 may power on. Immediately after powering on, the satellite 1000 may initialize all systems as required for operation of the satellite 1000. Once initialized, the satellite 1000 may begin the deployment process of step 3020 without any further external intervention, such as the detection of an external signal.

In other embodiments, step 3020 may be initiated manually. A signal may be sent to the satellite 1000 from ground level. The signal may take the form of an RF signal, optical signal, or any other means known in the art for communicating with an orbiting satellite from ground level. Preferably, this signal takes the form of a UHF or S-Band RF signal for uplinking data, and an S, X, and/or Ka band RF signal or optical signal for downlinking data. In embodiments wherein step 3020 is initiated manually, the satellite 1000 receives an initiation signal to initiate the deployment process.

In some embodiments, step 3020 may be initiated automatically, with a manual override or backup system. Once placed into orbit, the satellite 1000 may automatically begin the deployment process 3020. If the deployment process fails to initiate, step 3020 may be initiated manually. A signal may be sent to the satellite 1000 from ground level. The signal may take the form of an RF signal, optical signal, or any other means known in the art for communicating with an orbiting satellite from ground level. When step 3020 is initiated manually, the satellite 1000 receives an initiation signal to initiate the deployment process.

During step 3020, the optical system 1200 is varied in position. Before step 3020, the optical system 1200 lies substantially within the frame 1100. During step 3020, the optical system 1200 is actuated such that portions of the optical system 1200 lie substantially outside the frame 1100.

Figure 7A:
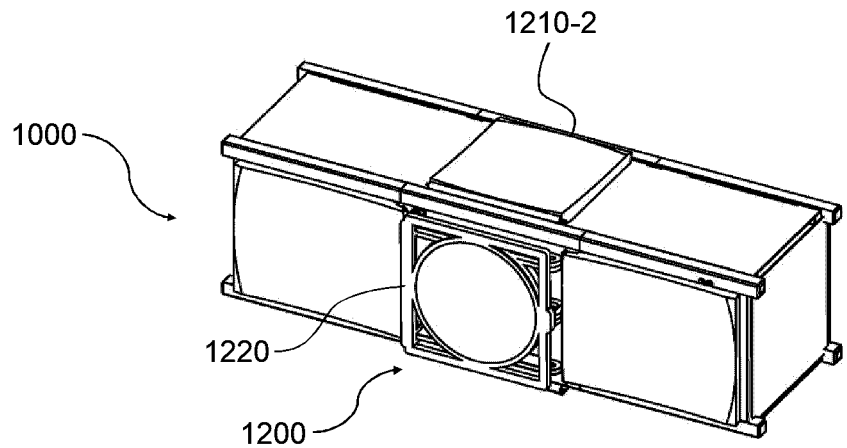
FIG. 7A illustrates a perspective view of a deployment process of the secondary mirror of the embodiment of FIGS. 1-4.
Figure 7B:
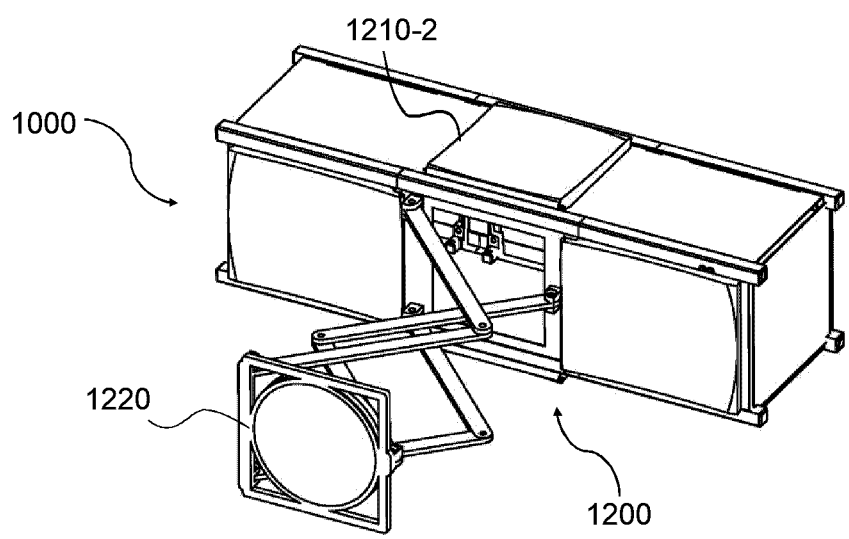
FIG. 7B illustrates a further progression of the deployment process illustrated in FIG. 7A.
Figure 7C:
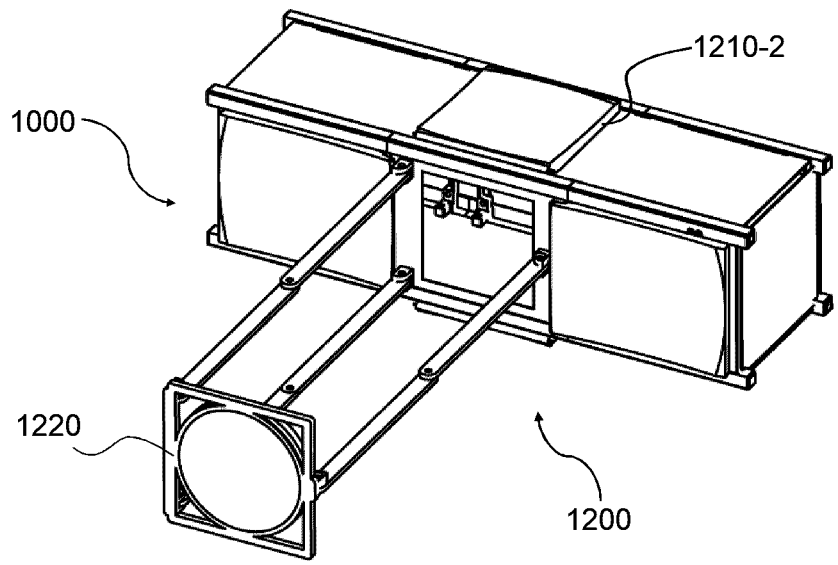
FIG. 7C illustrates a further progression of the deployment process illustrated in FIGS. 7A and 7B.

In the embodiment of FIGS. 1-4, the deployment process of step 3020 comprises deploying the deployable primary mirror segments 1210-2 and secondary mirror 1220. First, the secondary mirror 1220 is deployed. The secondary mirror deployment mechanism 1240 is actuated, expanding the mechanism comprising the deployment mechanism 1240 away from the frame 1100, along the optical axis 1140, extending the secondary mirror 1220 away from the frame 1100, along the optical axis 1140. The secondary mirror 1220 is extended away from the frame 1100 until it reaches the desired final deployed position. The deployment process of the secondary mirror 1220 of the embodiment of FIGS. 1-4 is shown in FIG. 7.

In some embodiments, after the deployment of the secondary mirror 1220, the secondary mirror 1220 may be optically aligned. This process may include a coarse adjustment process, in which the secondary mirror 1220 position is varied such that it is in approximately the position that results in optimal optical performance of the optical system 1200. Afterwards, a fine adjustment process may be conducted in which the secondary mirror 1220 position is varied such that it is in precisely the position that results in optimal optical performance of the optical system 1200, within the physical constraints of the optical system 1200.

In some embodiments, the micro-adjustment mechanism 1214 is configured such that the secondary mirror 1220 (and reflecting surface thereof) is finely varied in position relative to the frame 1100.

In some embodiments, one or both of the fine and coarse adjustment processes may comprise closed loop adjustment processes, wherein the optical system 1200 is continuously provided with a feedback signal, in order to optimize the secondary mirror 1220 position for optimal performance.

In some embodiments, the feedback signal may be in the form of an optical signal captured by a detector at the image plane or by an optical recording medium such as a CMOS sensor within a wavefront sensor. In other embodiments, the feedback signal may be in the form of the output of position sensors that may precisely locate the position of the secondary mirror 1200 relative to the rest of the components of the optical system 1200. This may be accomplished using laser interferometric or capacitive position sensors.

In other embodiments, one or both of the fine and coarse adjustment processes may comprise open loop processes, in which position or performance feedback is not provided to the micro-adjustment mechanism 1214 in order to optimize the secondary mirror 1220 position.

In some embodiments, the coarse adjustment may comprise the additional step of positioning the satellite 1000 using an attitude determination and control system (ADCS) such that the optical axis 1140 is pointed away from the Earth. The positions of the optical system 1200 components are then adjusted until the star field captured by an optical recording is in focus.

In some embodiments, the fine adjustment may comprise positioning the satellite 1000 using an ADCS such that the optical axis 1140 is directed towards a ground target or known star field. Components of the optical system 1200 may be adjusted in position continuously until the magnitude and resolution of the image captured by an optical recording medium is maximized.

Figure 8A:
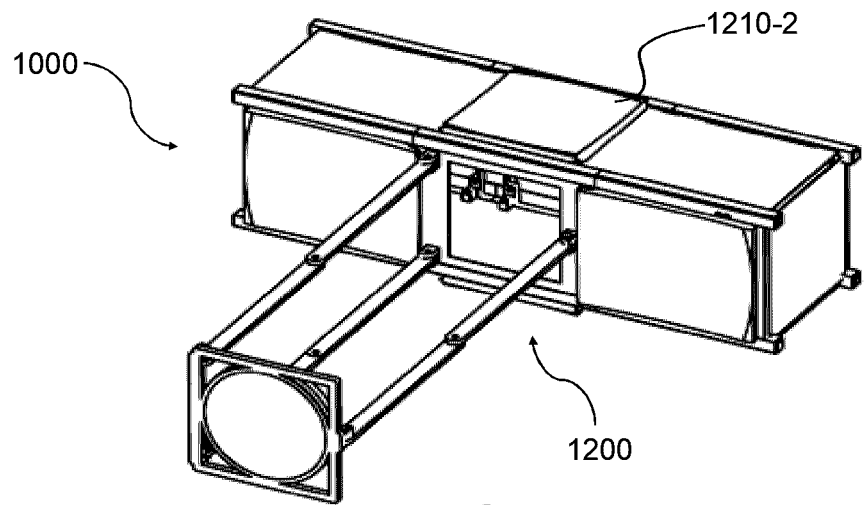
FIG. 8A illustrates a perspective view of the deployment process of the primary mirror segments of the embodiment of FIGS. 1-4, 7A, 7B, and 7C.
Figure 8B:
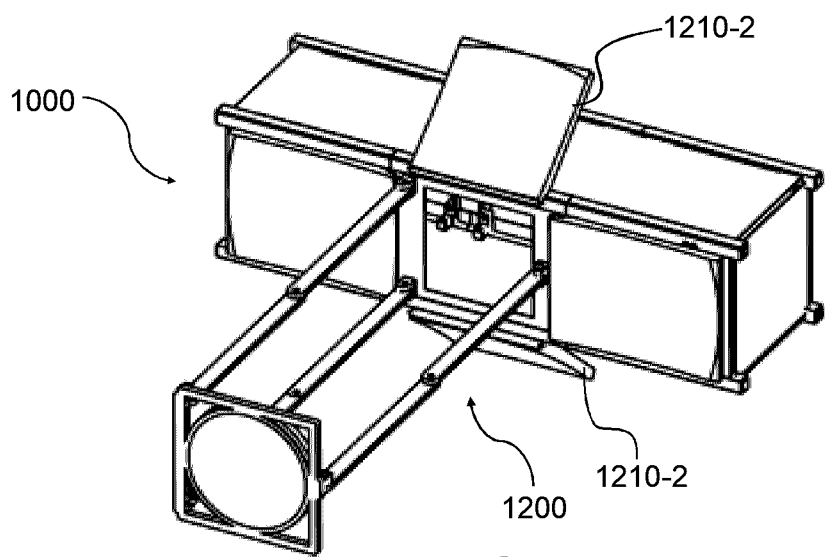
FIG. 8B illustrates a further progression of the deployment process illustrated in FIG. 8A.
Figure 8C:
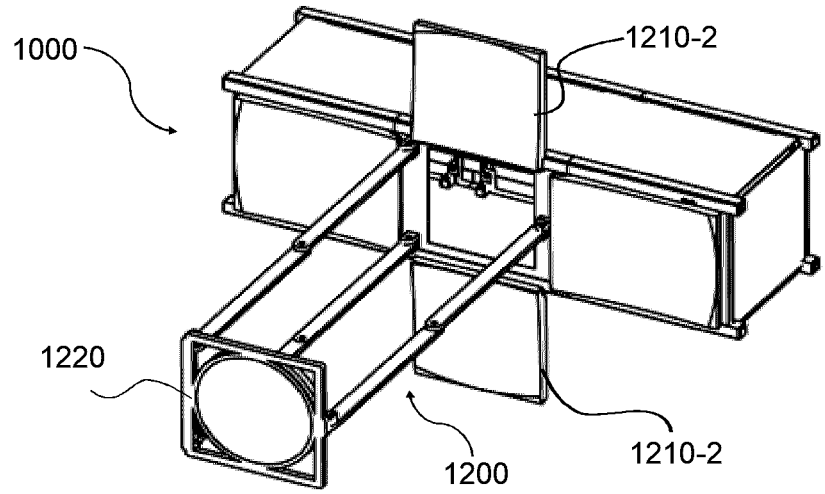
FIG. 8C illustrates a further progression of the deployment process illustrated in FIGS. 8A and 8B.

In the embodiment of FIGS. 1-4, the deployment process of step 3020 next comprises deploying the deployable primary mirror segments 1210-2. The satellite 1000 of the embodiment of FIGS. 1-4 comprises two deployable primary mirror segments 1210-2. The first deployable primary mirror segment 1210-2 is deployed. The primary mirror segment 1210-2 is coupled to the frame 1100, with one rotational degree of freedom. The rotational mechanism is actuated mechanically, using energy stored in a spring system, rotating away from the frame 1100, until the deployable primary mirror segment 1210-2 is adjacent to the mechanical aperture 1230, in the position illustrated in FIG. 1. The deployment process of the primary mirror segments 1210-2 of the embodiment of FIGS. 1-4 is shown in FIG. 8.

After one primary mirror segment 1210-2 is deployed, a further adjustment process may be conducted. In embodiments in which primary mirror segments further comprise a primary mirror optical surface 1212 and micro-adjustment mechanism 1214, the micro-adjustment mechanism 1214 may adjust the position of the primary mirror optical surface 1212, such that it is optically aligned with the rest of the optical system 1200. The micro-adjustment mechanism 1214 may first conduct a coarse adjustment process. The primary mirror optical surface 1212 is varied in position to approximately the position which is desired for optimal optical performance. After the coarse adjustment process, the micro-adjustment mechanism 1214 may conduct a fine adjustment process, in which the primary mirror optical surface 1212 is varied in position such that it is placed where it may allow for optimal optical performance of the optical system 1200. The micro-adjustment mechanism 1214 may be configured such that the primary mirror optical surface 1212 may be finely varied in position relative to the frame 1100.

In some embodiments, one or both of the fine and coarse adjustment processes may comprise closed loop adjustment processes, wherein the optical system 1200 is continuously provided with a feedback signal, in order to optimize the primary mirror optical surface 1212 position for optimal performance.

In some embodiments, the feedback signal may be in the form of an optical signal captured by a detector at the image plane or by an optical recording medium such as a CMOS within a wavefront sensor. In other embodiments, the feedback signal may be in the form of the output of position sensors that may precisely locate the position of the primary mirror optical surface 1212 relative to the rest of the components of the optical system 1200. Position sensors may include laser interferometric or capacitive position sensors.

In other embodiments, one or both of the fine and coarse adjustment processes may comprise open loop processes, in which position or performance feedback is not provided to the micro-adjustment mechanism 1214 in order to optimize the primary mirror optical surface 1212 position.

In some embodiments, the coarse adjustment may comprise the additional step of positioning the satellite 1000 using an ADCS such that the optical axis 1140 is pointed away from the Earth. The positions of the optical system 1200 components are then adjusted until the star field captured by an optical recording is in focus.

In some embodiments, the fine adjustment may comprise positioning the satellite 1000 using an ADCS such that the optical axis 1140 is directed towards a ground target or known star field. Components of the optical system 1200 may be adjusted in position continuously until the magnitude and resolution of the image captured by an optical recording medium is maximized.

After the first deployable primary mirror segment 1210-2 is deployed, the second deployable primary mirror segment 1210-2 is deployed. The primary mirror segment 1210-2 is coupled to the frame 1100, with one rotational degree of freedom. The rotational mechanism is actuated mechanically rotating away from the frame 1100, until the deployable primary mirror segment 1210-2 is adjacent to the mechanical aperture 1230, in the position illustrated in FIG. 1.

A further adjustment process may be conducted. In embodiments in which the primary mirror segments further comprise a primary mirror optical surface 1212 and micro-adjustment mechanism 1214, the micro-adjustment mechanism 1214 may adjust the position of the primary mirror optical surface 1212, such that it is optically aligned with the rest of the optical system 1200. The micro-adjustment mechanism 1214 may first conduct a coarse adjustment process. The primary mirror optical surface 1212 is varied in position to approximately the position which is desired for optimal optical performance. After the coarse adjustment process, the micro-adjustment mechanism 1214 may conduct a fine adjustment process, in which the primary mirror optical surface 1212 is varied in position such that it is placed where it may allow for the optimal optical performance of the optical system 1200. The micro-adjustment mechanism 1214 may be configured such that the primary mirror optical surface 1212 may be finely varied in position relative to the frame 1100.

In some embodiments, one or both of the fine and coarse adjustment processes may comprise closed loop adjustment processes, wherein the optical system 1200 is continuously provided with a feedback signal, in order to optimize the primary mirror optical surface 1212 position for optimal performance.

In some embodiments, the feedback signal may be in the form of an optical signal captured by a detector at the image plane or by an optical recording medium such as a CMOS sensor within a wavefront sensor. In other embodiments, the feedback signal may be in the form of the output of position sensors that may precisely locate the position of the primary mirror optical surface 1212 relative to the rest of the components of the optical system 1200. Position sensors may include laser interferometric, or capacitive position sensors.

In other embodiments, one or both of the fine and coarse adjustment processes may comprise open loop processes, in which position or performance feedback is not provided to the micro-adjustment mechanism 1214 in order to optimize the primary mirror optical surface 1212 position.

In some embodiments, the coarse adjustment may comprise the additional step of positioning the satellite 1000 using an ADCS such that the optical axis 1140 is pointed away from the Earth. The positions of the optical system 1200 components are then adjusted until the star field captured by an optical recording is in focus.

In some embodiments, the fine adjustment may comprise positioning the satellite 1000 using an ADCS such that the optical axis 1140 is directed towards a ground target or known star field. Components of the optical system 1200 may be adjusted in position continuously until the magnitude and resolution of the image captured by an optical recording medium is maximized.

In other embodiments, the satellite 1000 may comprise additional deployable primary mirror segments 1210-2. In these embodiments, additional deployable primary mirror segments 1210-2 may continue to be deployed sequentially, until all primary mirror segments 1200 are in their final deployed position.

After all the primary mirror segments 1210 and secondary mirror 1220 are placed into the deployed position and finely aligned, the deployment process of step 3020 may further comprise an additional radiometric calibration process.

In other embodiments, components of the optical system 1200 may be deployed in another order. For example, the primary mirror segments 1210 may be deployed and aligned before the deployment of the secondary mirror 1200, or all primary mirror segments 1210 and secondary mirror 1220 may be fully deployed before any alignment steps are conducted. In other embodiments, deployment steps may be executed concurrently. For example, the secondary mirror 1220 and primary mirror segments 1210 may be deployed at the same time, or all primary mirror segments 1210-2 may be deployed at the same time, instead of sequentially.

In other embodiments, the deployment process of step 3020 may comprise the deployment of other optical components and or deploying components using different mechanisms. In other embodiments, the deployment process of method 3000 may further comprise additional alignment, focusing, calibrating, and testing steps.

After the completion of method 3000, the light-collecting area of the satellite 1000 may be increased such that it is larger than the possible light-collecting area of a satellite of the same size without a deployable optical system. As optical performance is proportional to light-collecting area, an increase in light-collecting area results in an increase in optical performance.

Figure 6:
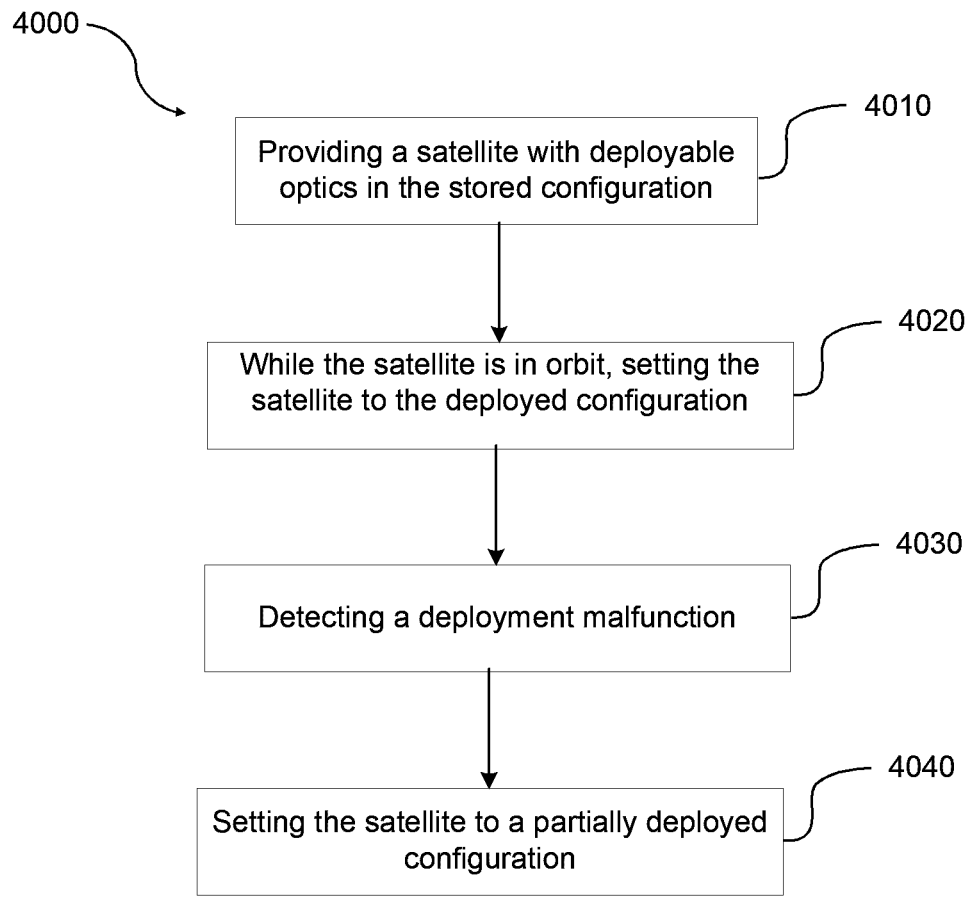
FIG. 6 illustrates a flow chart depicting an alternate method of configuring a satellite with deployable optics.

Referring now to FIG. 6, described therein is a method 4000 of configuring a satellite with deployable optics. In step 4010, a satellite 1000 with deployable optics is provided in the stored configuration.

At least one primary mirror segment 1210 of the satellite 1000 must remain relatively fixed in position. The preferred embodiment of FIGS. 1-2 has two primary mirror segments 1210-1 that are relatively fixed in position. These fixed primary mirror segments 1210-1 generally lie substantially within the volume of the frame 1100.

The optical system 1200 of the satellite 1000 additionally comprises a partially deployed configuration. The satellite 1000 comprises at least one primary mirror 1210-1 that is fixed in position, and at least one secondary mirror 1220 that is deployable, such that its position relative to the frame may be varied.

In step 4020, while the satellite 1000 is in orbit, the satellite 1000 is set to the deployed configuration, as shown in FIG. 1. The satellite 1000 is placed into orbit while in the stored configuration. The optical system 1200 components remain substantially within the frame 1100.

Any method of placing the satellite 1000 into orbit known in the art may be used. For example, the satellite 1000 may be placed onto a commercial launch vehicle, which may launch the satellite 1000 into orbit. In the embodiments wherein the frame 1100 is comprised of multiple CubeSat units, any method known in the art for launching CubeSats may be employed.

In some situations, launching methods may require a timeout period between satellite 1000 launch and satellite power up to reduce risk of damage to the launch vehicle. The satellite 1000 may be configured such that satellite power-up is time delayed from the time of separation from the launch vehicle.

Immediately after separating from the launch vehicle, the satellite 1000 may be travelling at an angular velocity of a magnitude too large to initiate the deployment process. A further waiting period may elapse before the next step, allowing the satellite 1000 to slow to the desired orbiting angular velocity, or below an angular velocity threshold that may allow for deployment of the optical system 1200.

Once the satellite 1000 is in its desired orbit, the method 4000 proceeds to step 4020. The satellite 1000 is set to the deployed configuration. The initiation of this step may be conducted automatically. For example, after a time delay as required by the launch process, the satellite 1000 may power on. Immediately after powering on, the satellite 1000 may initialize all systems as required for operation of the satellite 1000. Once initialized, the satellite 1000 may begin the deployment process of step 4020 without any further external intervention, such as the detection of an external signal.

In other embodiments, step 4020 may be initiated manually. A signal may be sent to the satellite 1000 from ground level. The signal may take the form of an RF signal, optical signal, or any other means known in the art for communicating with an orbiting satellite from ground level. Preferably, this signal takes the form of a UHF or S-Band RF signal for uplinking data, and an S, X, and or Ka band RF signal or optical signal for downlinking data. In embodiments wherein step 4020 is initiated manually, the satellite 1000 receives an initiation signal to initiate the deployment process.

In some embodiments, step 4020 may be initiated automatically, with a manual override or backup system. Once deployed into orbit, the satellite 1000 may automatically begin the deployment process. If the deployment process fails to initiate, step 4020 may be initiated manually. A signal may be sent to the satellite 1000 from ground level. The signal may take the form of an RF signal, optical signal, or any other means known in the art for communicating with an orbiting satellite from ground level. When step 4020 is initiated manually, the satellite 1000 receives an initiation signal to initiate the deployment process.

During step 4020, the optical system 1200 may be varied in position. Before step 4020, the optical system 1200 lies substantially within the frame 1100. During step 4020, the optical system 1200 is actuated such that portions of the optical system 1200 lie substantially outside the frame 1100.

In the embodiment of FIGS. 1-4, the deployment process of step 4020 comprises deploying the deployable primary mirror segments 1210-2 and secondary mirror 1220. First, the secondary mirror 1220 is deployed. The secondary mirror deployment mechanism 1240 is actuated, expanding the deployment mechanism 1240 away from the frame 1100, along optical axis 1140, extending the secondary mirror 1220 away from the frame 1100, along the optical axis 1140. The secondary mirror 1220 is extended away from the frame 1100 until it reaches the desired final deployed position. The deployment process of the secondary mirror 1220 of the embodiment of FIGS. 1-4 is shown in FIG. 7.

In some embodiments, after the deployment of the secondary mirror 1220, the secondary mirror 1220 may be optically aligned. This process may include a coarse adjustment process, in which the secondary mirror 1220 position is varied such that it is placed in approximately the position that results in optimal optical performance of the optical system 1200. Afterwards, a fine adjustment process may be conducted in which the secondary mirror 1220 position is varied such that it is in precisely the position that results in optimal optical performance of the optical system 1200, within the physical constraints of the optical system 1200.

In some embodiments, the micro-adjustment mechanism 1214 is configured such that the secondary mirror 1220 (and reflecting surface thereof) is finely varied in position relative to the frame 1100.

In some embodiments, one or both of the fine and coarse adjustment processes may comprise closed loop adjustment processes, wherein the optical system 1200 is continuously provided with a feedback signal, in order to optimize the secondary mirror 1220 position for optimal performance.

In some embodiments, the feedback signal may be in the form of an optical signal captured by an optical recording medium such as a CMOS sensor within a wavefront sensor. In other embodiments, the feedback signal may be in the form of the output of position sensors that may precisely locate the position of the secondary mirror 1200 relative to the rest of the components of the optical system 1200. This may be accomplished using laser interferometric or capacitive position sensors.

In other embodiments, one or both of the fine and coarse adjustment processes may comprise open loop processes, in which position or performance feedback is not provided to the micro-adjustment mechanism 1214 in order to optimize the secondary mirror 1220 position.

In some embodiments, the coarse adjustment may comprise the additional step of positioning the satellite 1000 using an ADCS such that the optical axis 1140 is pointed away from the Earth. The positions of the optical system 1200 components are then adjusted until the star field captured by an optical recording is in focus.

In some embodiments, the fine adjustment may comprise positioning the satellite 1000 using an ADCS such that the optical axis 1140 is directed towards a ground target or known star field. Components of the optical system 1200 may be adjusted in position continuously until the magnitude and resolution of the image captured by an optical recording medium is maximized.

In the embodiment of FIGS. 1-4, the deployment process of step 4020 next comprises deploying the deployable primary mirror segments 1210-2. The satellite 1000 of FIGS. 1-4 comprises two deployable primary mirror segments 1210-2. The first deployable primary mirror segment 1210-2 is deployed. The primary mirror segment 1210-2 is coupled to the frame 1100, with one rotational degree of freedom. The rotational mechanism is actuated mechanically rotating away from the frame 1100, until the deployable primary mirror segment 1210-2 is adjacent to the mechanical aperture 1230, in the position illustrated in FIG. 1. The deployment process of the primary mirror segments 1210-2 of the embodiment of FIG. 1-4 is shown in FIG. 8.

After one primary mirror segment 1210-2 is deployed, a further adjustment process may be conducted. In embodiments in which the primary mirror segments further comprise a primary mirror optical surface 1212 and a micro-adjustment mechanism 1214, the micro-adjustment mechanism 1214 may adjust the position of the primary mirror optical surface 1212, such that it is optically aligned with the rest of the optical system 1200. The micro-adjustment mechanism 1214 may first conduct a coarse adjustment process. The primary mirror optical surface 1212 is varied in position to approximately the position which is desired for optimal optical performance. After the coarse adjustment process, the micro-adjustment mechanism 1214 may conduct a fine adjustment process, in which the primary mirror optical surface 1212 is varied in position such that it is placed where it may allow for the optimal optical performance of the optical system 1200. The micro-adjustment mechanism 1214 may be configured such that the primary mirror optical surface 1212 may be finely varied in position relative to the frame 1100.

In some embodiments, one or both of the fine and coarse adjustment processes may comprise closed loop adjustment processes, wherein the optical system 1200 is continuously provided with a feedback signal, in order to optimize the primary mirror optical surface 1212 position for optimal performance.

In some embodiments, the feedback signal may be in the form of an optical signal captured by an optical recording medium such as a CMOS within a wavefront sensor. In other embodiments, the feedback signal may be in the form of the output of position sensors that may precisely locate the position of the primary mirror optical surface 1212 relative to the rest of the components of the optical system 1200. Position sensors may include laser interferometric or capacitive position sensors.

In other embodiments, one or both of the fine and coarse adjustment processes may comprise open loop processes, in which position or performance feedback is not provided to the micro-adjustment mechanism 1214 in order to optimize the primary mirror optical surface 1212 position.

In some embodiments, the coarse adjustment may comprise the additional step of positioning the satellite 1000 using an ADCS such that the optical axis 1140 is pointed away from the Earth. The positions of the optical system 1200 components are then adjusted until the star field captured by an optical recording is in focus.

In some embodiments, the fine adjustment may comprise positioning the satellite 1000 using an ADCS such that the optical axis 1140 is directed towards a ground target or known star field. Components of the optical system 1200 may be adjusted in position continuously until the magnitude and resolution of the image captured by an optical recording medium is maximized.

After the first deployable primary mirror segment 1210-2 is deployed, the second deployable primary mirror segment 1210-2 is deployed. The primary mirror segment 1210-2 is coupled to the frame 1100, with one rotational degree of freedom. The rotational mechanism is actuated mechanically, using stored spring energy, rotating away from the frame 1100, until the deployable primary mirror segment 1210-2 is adjacent to mechanical aperture 1230, in the position illustrated in FIG. 1.

A further adjustment process may be conducted. In embodiments in which the primary mirror segments further comprise a primary mirror optical surface 1212 and a micro-adjustment mechanism 1214, the micro-adjustment mechanism 1214 may adjust the position of the primary mirror optical surface 1212, such that it is optically aligned with the rest of the optical system 1200. The micro-adjustment mechanism 1214 may first conduct a coarse adjustment process. The primary mirror optical surface 1212 is varied in position to approximately the position which is desired for optimal optical performance. After the coarse adjustment process, the micro-adjustment mechanism 1214 may conduct a fine adjustment process, in which the primary mirror optical surface 1212 is varied in position such that it is placed where it may allow for the optimal optical performance of the optical system 1200. The micro-adjustment mechanism 1214 may be configured such that the primary mirror optical surface 1212 may be finely varied in position relative to the frame 1100.

In some embodiments, one or both of the fine and coarse adjustment processes may comprise closed loop adjustment processes, wherein the optical system 1200 is continuously provided with a feedback signal, in order to optimize the primary mirror optical surface 1212 position for optimal performance.

In some embodiments, the feedback signal may be in the form of an optical signal captured by a detector at the image plane or by an optical recording medium such as a CMOS within a wavefront sensor. In other embodiments, the feedback signal may be in the form of the output of position sensors that may precisely locate the position of the primary mirror optical surface 1212 relative to the rest of the components of the optical system 1200. Position sensors may include laser interferometric or capacitive position sensors.

In other embodiments, one or both of the fine and coarse adjustment processes may comprise open loop processes, in which position or performance feedback is not provided to the micro-adjustment mechanism 1214 in order to optimize the primary mirror optical surface 1212 position.

In some embodiments, the coarse adjustment may comprise the additional step of positioning the satellite 1000 using an ADCS such that the optical axis 1140 is pointed away from the Earth. The positions of the optical system 1200 components are then adjusted until the star field captured by an optical recording is in focus.

In some embodiments, the fine adjustment may comprise positioning the satellite 1000 using an ADCS such that the optical axis 1140 is directed towards a ground target or known star field. Components of the optical system 1200 may be adjusted in position continuously until the magnitude and resolution of the image captured by an optical recording medium is maximized.

In other embodiments, the satellite 1000 may comprise additional deployable primary mirror segments 1210-2. In these embodiments, the additional deployable primary mirror segments 1210-2 may continue to be deployed sequentially, until all primary mirror segments 1200 are in their final deployed position.

After all the primary mirror segments 1210 and secondary mirror 1200 are placed into the deployed position and finely aligned, the deployment process of step 4020 may further comprise an additional radiometric calibration process.

In other embodiments, components of the optical system 1200 may be deployed in another order. For example, the primary mirror segments 1210 may be deployed and aligned before the deployment of the secondary mirror 1200, or all the primary mirror segments 1210 and secondary mirror 1220 may be fully deployed before any alignment steps are conducted. In other embodiments, deployment steps may be executed concurrently. For example, the secondary mirror 1220 and primary mirror segments 1210 may be deployed at the same time, or all the primary mirror segments 1210-2 may be actuated at the same time, instead of sequentially.

In other embodiments, the deployment process of step 4020 may comprise the deployment of other optical components and or deploying components using different mechanisms. In other embodiments, the deployment process of method 4000 may further comprise additional alignment, focusing, calibrating, and testing steps.

At any point during step 4020, step 4030 may occur, wherein a deployment malfunction is detected. A deployment malfunction may take on various forms, depending on the embodiment of the satellite provided at step 4010. In the embodiment of FIGS. 1-4, deployment malfunctions may comprise, but are not limited to, failure of any primary mirror segment 1210-2 to deploy. This failure may be caused by mechanical, electrical, or control system failures, physical damage to satellite 1000, or any other fault that renders the fully deployed configuration of optical system 1200 inoperable.

Deployment malfunctions may be detected by a plurality of means. Position sensors placed on various components of the optical system 1200 may detect when a component is in a position beyond its operational position, detecting a deployment malfunction of the optical system 1200 as per step 4030. In other situations, the optical system 1200 may be equipped with an optical recording medium such as a CMOS image sensor. The output signal of the optical recording medium may indicate that the deployment process malfunctioned, initiating step 4030. In other embodiments, other means known in the art may be used to detect a deployment malfunction.

After a deployment malfunction is detected in step 4030, step 4040 is conducted, in which the satellite 1000 is set to a partially deployed configuration.

In the embodiment of FIGS. 1-4, the satellite 1000 comprises two fixed primary mirror segments 1210-1. The fixed primary mirror segments 1210-1 do not vary in position between the deployed configuration and stored configuration of the satellite 1000. The partially deployed configuration of the satellite 1000 comprises the primary mirror segments 1210 in the stored configuration and fully deploying the secondary mirror 1220. The light-collecting area of the satellite 1000 in the partially deployed configuration is equal to the light-collecting area of both fixed primary mirror segments 1210-1. The deployable primary mirror segments 1210-2 do not contribute to light collection as they are not in a fully deployed state. This results in a reduced light-collecting area versus the fully deployed configuration, wherein all primary mirror segments 1210 are used for light collection. The partially deployed configuration provides a reliability and robustness advantage, allowing for the satellite 1000 to function if the deployment process malfunctions for any reason.

If the deployment malfunction detection step 4030 occurs at a point in the deployment process such that components not required to be deployed for the operation of the satellite in the partially deployed configuration have been deployed, the deployment process of those components may be reversed at step 4040. For example, if the deployable primary mirror segments 1210-2 deploy partially before the deployment malfunction detection of step 4030 occurs, deployment of the deployable primary mirror segments 1210-2 may be reversed. The deployable primary mirror segments 1210-2 may be actuated such that they are placed into their stored configuration wherein they lie substantially within the frame 1100, as shown in FIG. 2.

In some embodiments, the deployable primary mirror segments 1210-2 may be actuated such that they are reversed partially. In this situation, the light-collecting area of the satellite 1000 is equal to the light-collecting area of both fixed primary mirror segments 1210-1. Although the performance of the satellite 1000 will not thereby be improved, it will not be degraded either.

In some situations, the deployment malfunction detected in step 4030 may coexist with a condition that prevents the reversal of the deployment of components not required for the partially deployed configuration of the satellite 1000. In such scenarios, the components may remain deployed; however, their deployment may reduce the performance or reliability of the satellite 1000.

In other situations, deployment malfunction may occur in relation to a component that is required to be deployed for proper functioning of the satellite in the partially deployed configuration. In these situations, method 4000 is not viable, as the satellite will not be capable of being placed into a partially deployed configuration that still provides partial functionality. For example, in the embodiment of FIGS. 1-4, the secondary mirror 1220 may fail to deploy. In that situation, the optical system 1200 will not be operational. No partially deployed configuration will be possible.

In some embodiments, the primary mirror is a fixed in position, curved mirror consisting of a single segment coupled to the frame.

In some embodiments, the secondary mirror is mounted on a secondary mirror arm coupled to the frame via revolute joints mounted on either side of the primary mirror.

Figure 9B:
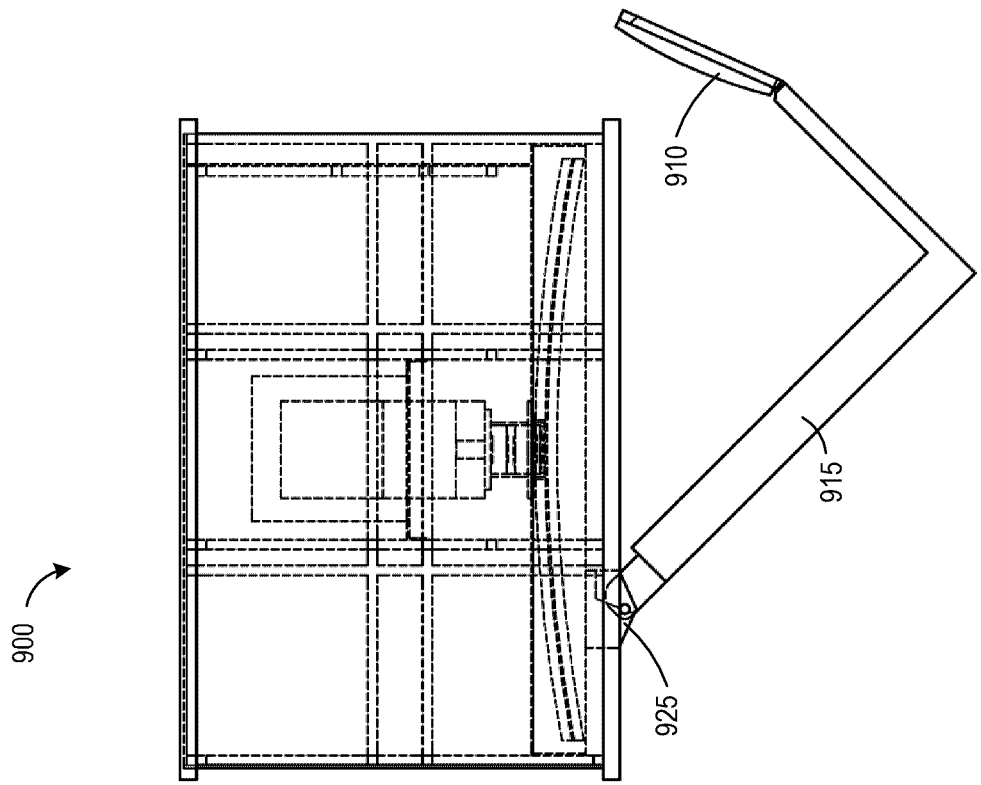
FIGS. 9A, 9B, and 9C illustrate a right-side detail view of an alternative embodiment of a satellite with deployable optics, in the stored, in the process of deploying and fully deployed configurations respectively.
Figure 9A:
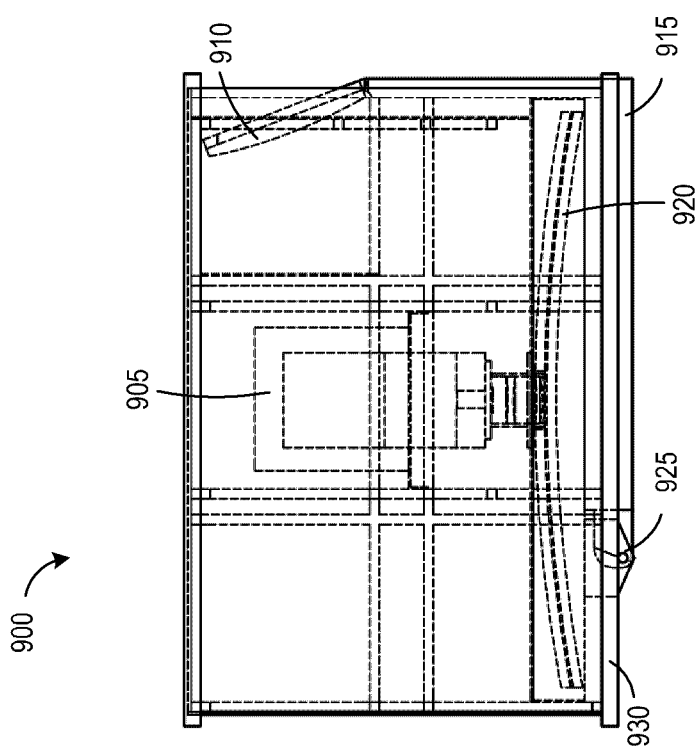
Figure 9C:
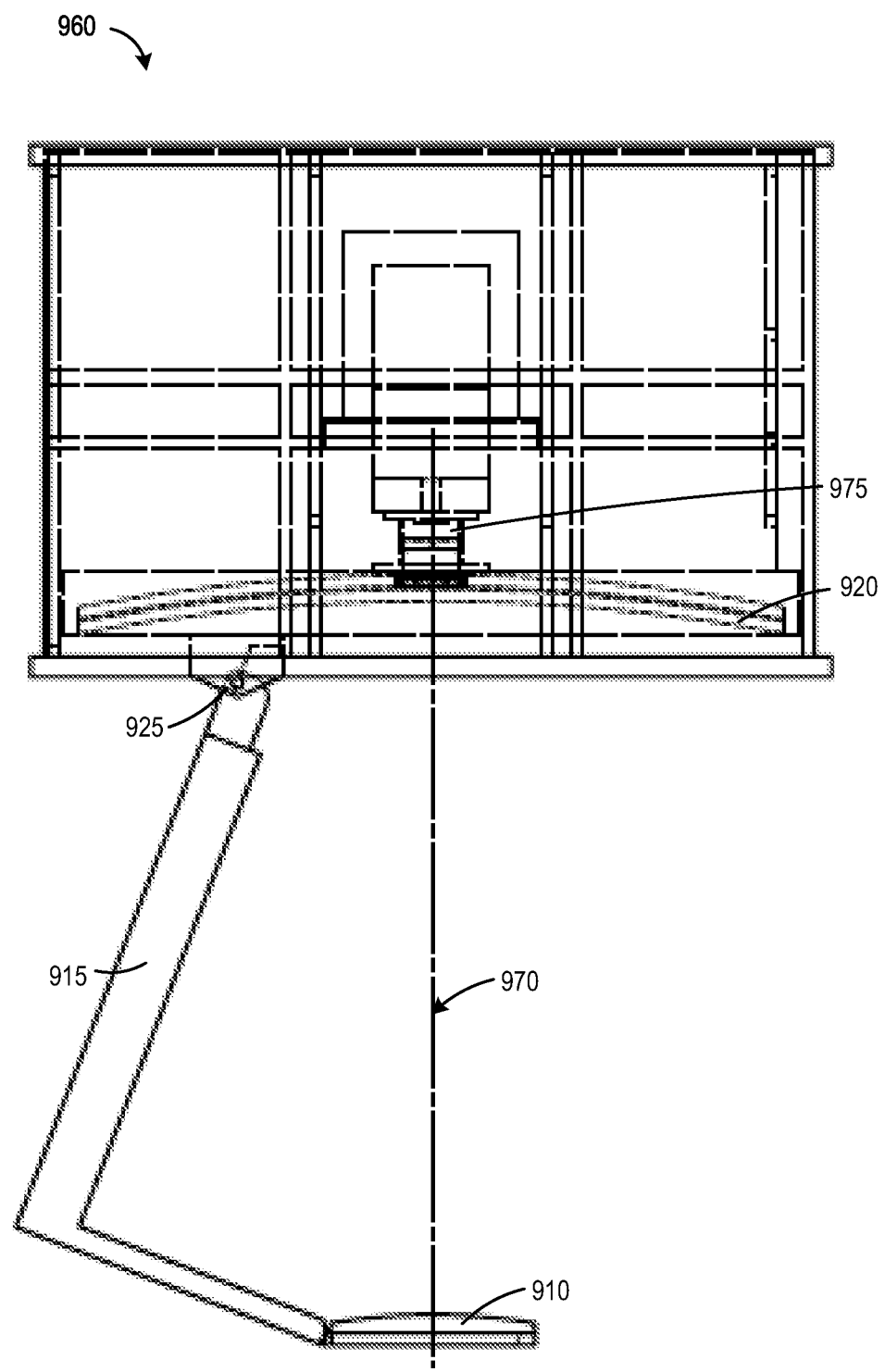
Figure 10A:
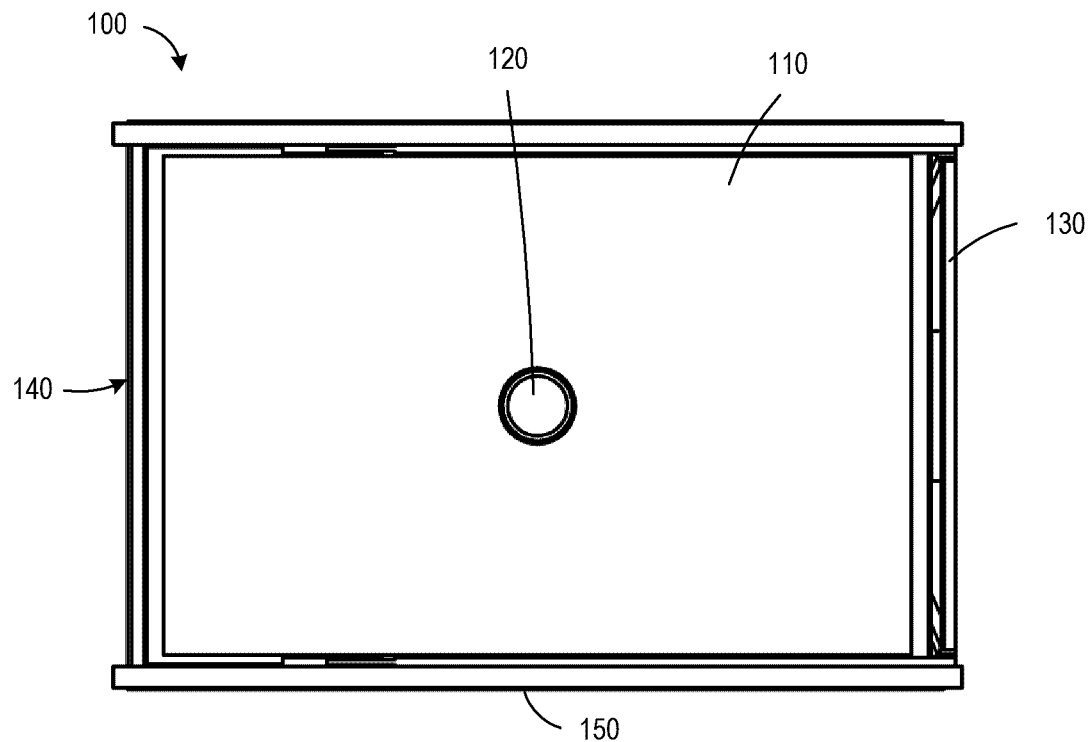
FIG. 10A illustrates a top side view of the embodiment of FIG. 9A with the secondary mirror frame removed.
Figure 10B:
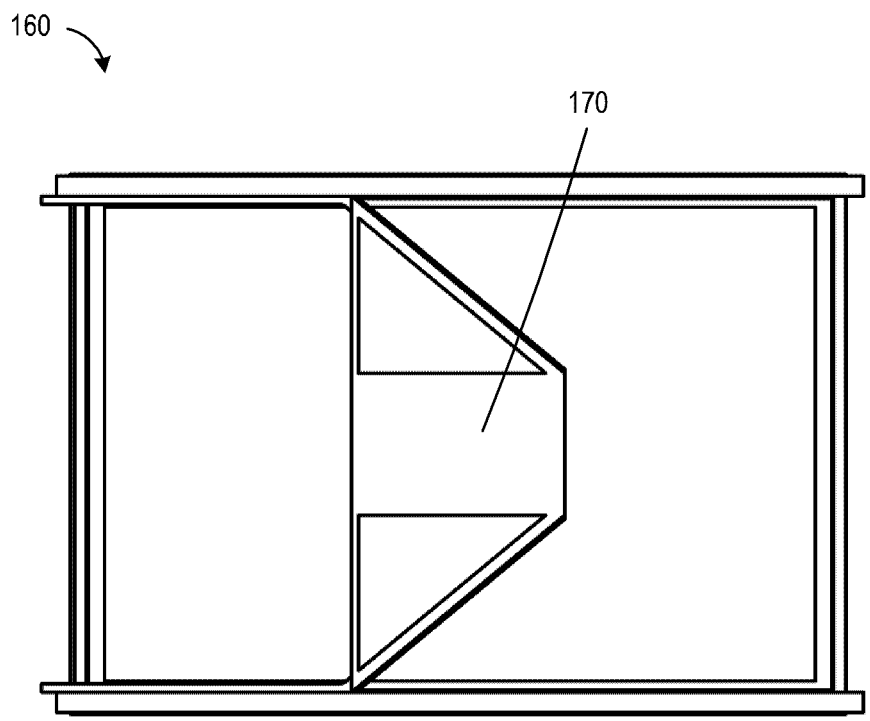
FIG. 10B illustrates a top side view of the embodiment of FIG. 9A with the secondary mirror frame deployed.

Referring now to FIGS. 9A, 9B, and 9C, shown therein is an embodiment of a satellite 900 with a deployable optical system, in the stored, deploying, and deployed configurations, respectively. The satellite comprises a frame 930. The frame 930 may be constructed from aluminum alloy or any other material known in the art suitable for the construction of satellite structures. The frame of satellite 900 may be constructed similarly to satellite 1100.

The arm the secondary mirror is mounted on, in the stowed configuration, flush to two sides (e.g., the right and top side) of the satellite body, consisting of extending members parallel to the primary mirror and extending members perpendicular to the primary mirror, where the extending members form a bent U shape, with the secondary mirror at the apex of the U, with a 90-degree bend in the middle. When viewed from the right side as in FIGS. 9A-C, it forms an L shape.

A greater or lesser number of CubeSat units may be used to form the frame 930 of the satellite 900. For example, two CubeSat units may be assembled to form a 2U configuration with approximate external dimensions of 10 cm×10 cm×20 cm. In other embodiments, twelve CubeSat units may be assembled, forming a 12U CubeSat configuration with approximate external dimensions of 20 cm×20 cm×34 cm. In other embodiments, any other operational configuration of CubeSat units may be assembled to form the frame 900.

The embodiment described herein allows the optical components that require a volume of free space to utilize volume outside of the envelope of the frame 930, allowing for a greater amount of usable volume within the frame 930 of the satellite 900. This effectively reduces the required volume for a satellite of specific function and performance. As a result, a satellite of specific optical performance may be lower cost if equipped with a deployable optical system.

The frame 930 further comprises an optical axis 970. The frame 930 may be approximately described as a rectangular prism. In the embodiment of FIGS. 9A-C, the optical axis 970 intersects two planar longitudinal faces of the volume of the frame 930 such that the optical axis 930 is perpendicular to both of the two planar faces intersected.

The satellite 900 further comprises an optical system 905, defined as encompassing all mechanical and optical components related to the optical imaging capabilities of the satellite 900.

The optical system 905 of the satellite 900 is arranged such that there are two possible configurations of the optical system 905. The configurations include a stored configuration and deployed configuration. The satellite 900 in the deployed configuration is shown in FIG. 9C. The satellite 900 in the stored configuration is shown in FIG. 9A.

In the embodiment of satellite 900 in FIGS. 9A-C, the optical system 905 of the satellite 900 further comprises a primary mirror 920 and a secondary mirror 910. The optical system may be a catadioptric optical system, comprising a modified Cassegrain telescope with additional refracting optics.

When in operation, light is collected by the primary mirror 920, then focused and directed towards the secondary mirror 910, which further focuses and directs collected light towards the mechanical aperture 975, along the optical axis 970.

In the stored configuration satellite 900 of FIG. 9A, the components of the optical system 905 are positioned such that they are largely flush with or within the frame 930 of the satellite 900. For example, the primary mirror 920 is within the volume of the frame 930. The secondary mirror 910 is retracted behind the frame 930. Mechanical components associated with the secondary mirror 910, such as the arm the mirror is mounted on, arm 915, are folded such as they are flush with the frame 930, but they may extend beyond the frame slightly (e.g., by 6 mm).

Figure 11A:
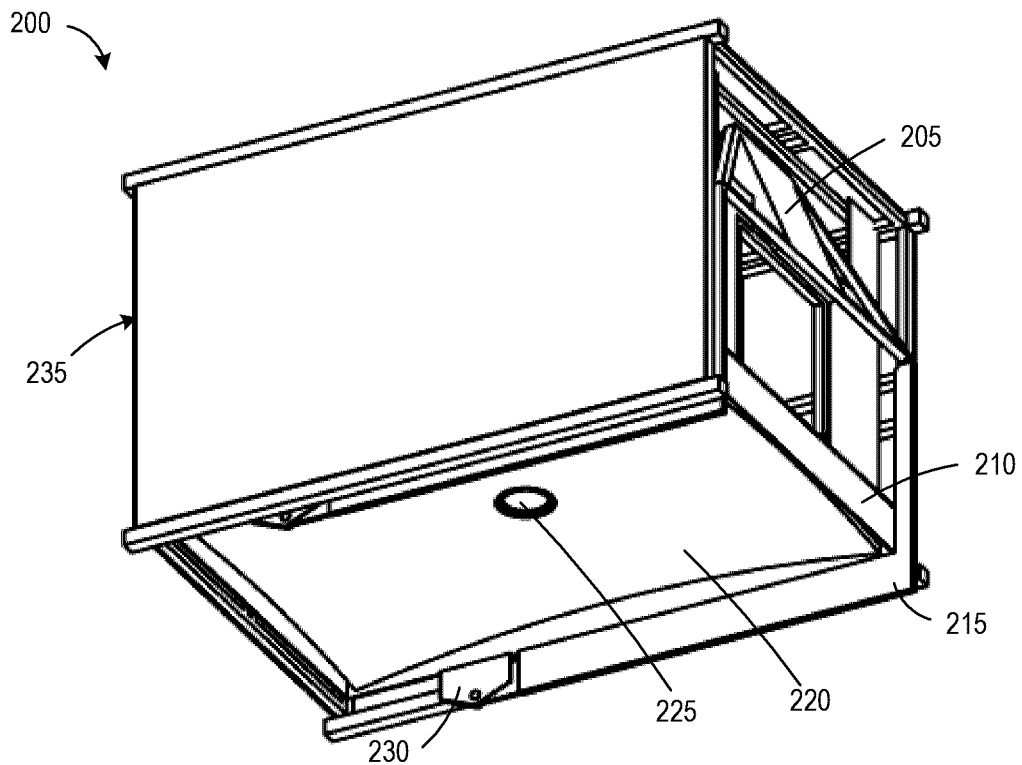
FIGS. 11A, 11B, and 11C illustrates a perspective view of a deployment process of the secondary mirror of the embodiment of FIGS. 9-10, with 11A is the stored configuration, 11B in the process of deploying, and 110 fully deployed.
Figure 11B:
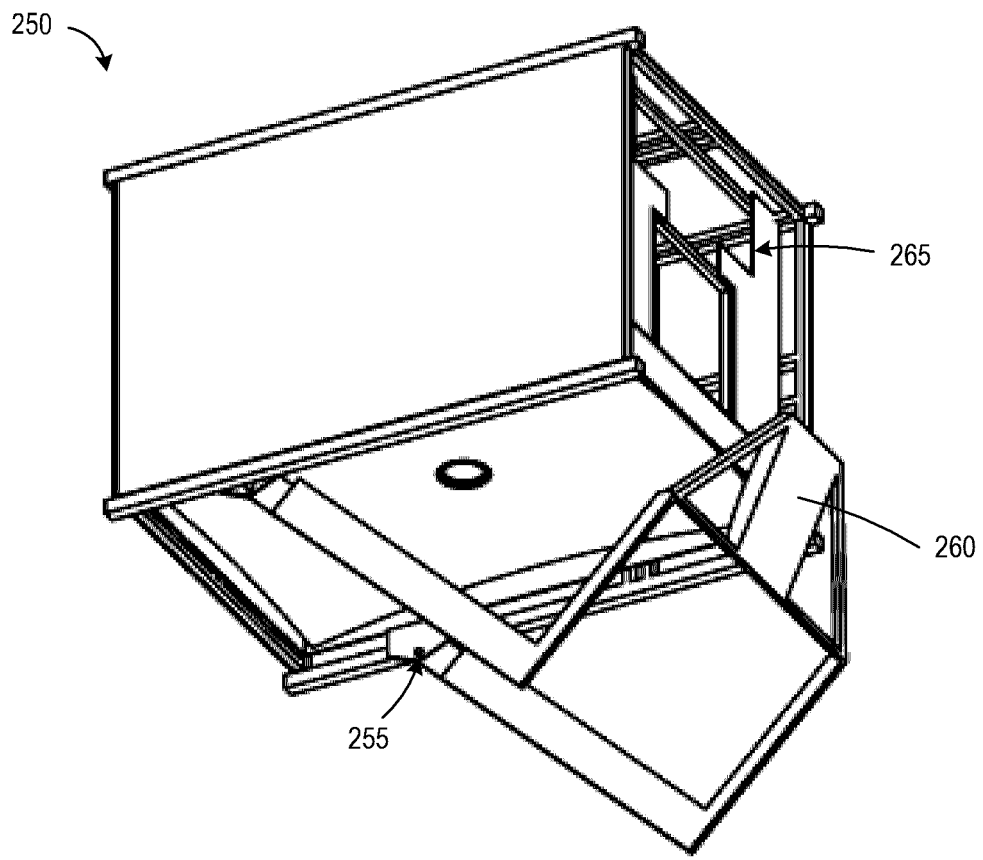
Figure 12:
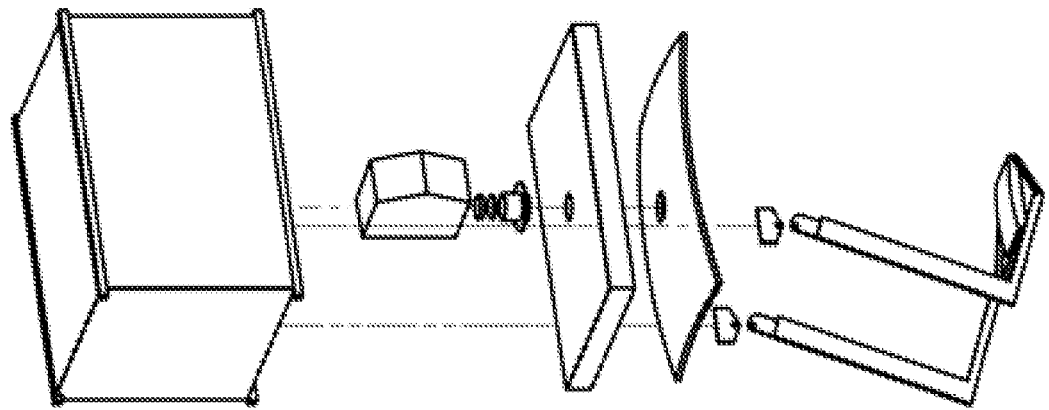
FIG. 12 illustrates an exploded perspective view of the parts of FIGS. 9-11.
Figure 11C:
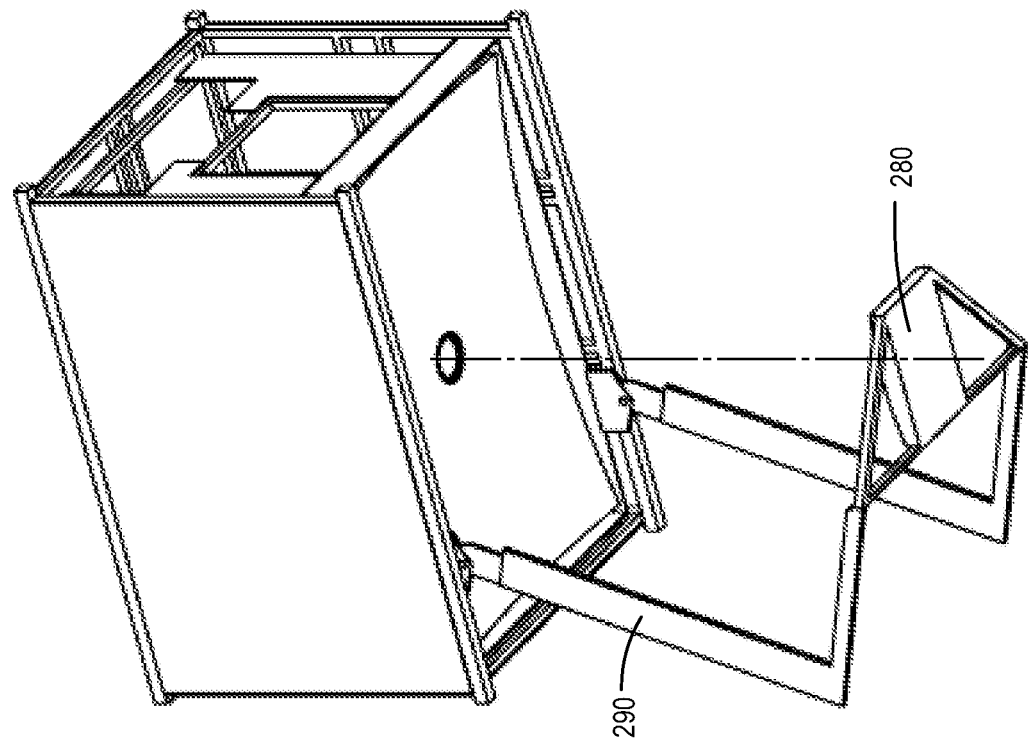

The secondary mirror 910 may be mounted on the arm 915, that may be constructed out of aluminum, also shown as a secondary mirror 280 mounted on an arm 290 in FIG. 11C, attached via two revolute joints that it rotates around to deploy.

In the deployed configuration of FIG. 9C, the components of the optical system 905 are positioned such that many may extend substantially outside of the volume defined by the frame 930. The secondary mirror 910, coupled to arm 915, is actuated by a secondary mirror deployment mechanism, such that it rotates away from the frame 930, around revolute joints 925, which are coupled to either side of frame 930 to have one degree of rotational freedom, as seen in FIGS. 11A-C, to be deployed substantially along the optical axis 970, no longer flush with the frame.

The primary mirror 920 is coupled to the frame 930 and does not deploy during the deployment process. During the deployment process, the secondary mirror 910 and the secondary mirror arm 915 it is mounted on are released, for example, via an electric signal sent to unlock a locking mechanism. Once unlocked, the deployable secondary mirror 910 can be actuated by stored mechanical spring energy and can rotate around revolute joints 925, with the process shown in the changes from FIG. 9A-C. In other embodiments, other actuation means may be used, such as pneumatic, hydraulic, electro-magnetic, or by any other means known in the art for actuating mechanical components.

The primary mirror 920 may remain relatively fixed in position. The embodiments of FIGS. 9-13 have a primary mirror 920 that is relatively fixed in position. This primary mirror 920 generally lies substantially within the volume of the frame 930.

The optical system 905 of the satellite 900 may further utilize an adaptive optic system.

Any method of placing the satellite 900 into orbit known in the art may be used. For example, the satellite 900 may be placed onto a commercial launch vehicle, which may launch the satellite 900 into orbit. In the embodiments in which the frame 930 is comprised of multiple CubeSat units, any method known in the art for launching CubeSats may be employed.

In some situations, launching methods may require a timeout period between satellite launch and satellite power-up to reduce risk of damage to the launch vehicle. The satellite 900 may be configured such that satellite power-up is time-delayed from the time of separation from launch vehicle.

Immediately after separating from the launch vehicle, the satellite 900 may be travelling at an angular velocity of a magnitude too large to initiate the deployment process. A further waiting period may elapse before the next step, allowing the satellite 900 to slow to the desired orbiting angular velocity, or below an angular velocity threshold that may allow for deployment of the optical system 905.

Once the satellite 900 is in its desired orbit, step 3020 of method 3000 may be executed. The satellite 900 is set to the deployed configuration. The initiation of this step may be conducted automatically. For example, after a time delay as required by the launch process, the satellite 900 may power on. Immediately after powering on, the satellite 900 may initialize all systems as required for operation of the satellite 900. Once initialized, the satellite 900 may begin the deployment process of step 3020 without any further external intervention, such as the detection of an external signal.

In other embodiments, step 3020 may be initiated manually. A signal may be sent to the satellite 900 from ground level. The signal may take the form of an RF signal, optical signal, or any other means known in the art for communicating with an orbiting satellite from ground level. This signal may take the form of a UHF or S-Band RF signal for uplinking data, and an S, X, and/or Ka band RF signal or optical signal for downlinking data. In embodiments in which step 3020 is initiated manually, the satellite 900 may receive an initiation signal to initiate the deployment process.

In some embodiments, step 3020 may be initiated automatically, with a manual override or backup system. Once placed into orbit, the satellite 900 may automatically begin the deployment process 3020. If the deployment process fails to initiate, step 3020 may be initiated manually. A signal may be sent to the satellite 900 from ground level. The signal may take the form of an RF signal, optical signal, or any other means known in the art for communicating with an orbiting satellite from ground level. When step 3020 is initiated manually, the satellite 900 receives an initiation signal to initiate the deployment process.

During step 3020, the optical system 905 may be varied in position. Before step 3020, the optical system 905 may lie substantially within the frame 930. During step 3020, the optical system 905 may be actuated such that portions of the optical system 905 lie substantially outside the frame 930.

In the embodiment of FIGS. 9A-C, the deployment process comprises deploying the secondary mirror 910 and secondary mirror arm 915. First, the secondary mirror 910 is deployed. The secondary mirror deployment mechanism is actuated, rotating the mechanism comprising the secondary mirror 910 and secondary mirror arm 915 away from the frame 930, rotating the secondary mirror 910 around the frame 930, until it is centered with the optical axis 970. The secondary mirror 910 is rotated around the revolute joints 925 until it reaches the desired final deployed position, as seen in FIG. 9C.

In some embodiments, after the deployment of the secondary mirror 910, the secondary mirror 910 may be optically aligned. This process may include a coarse adjustment process, in which the secondary mirror 910 position is varied such that it is in approximately the position with respect to the primary mirror that results in optimal optical performance of the optical system 905. Afterwards, a fine adjustment process may be conducted in which the secondary mirror 910 position is varied such that it is in precisely the position that results in optimal optical performance of the optical system 905, within the physical constraints of the optical system 905.

In some embodiments, the micro-adjustment mechanism 1214 is configured such that the secondary mirror 910 (and reflecting surface thereof) is finely varied in position relative to the frame 930.

In some embodiments, the fine and coarse adjustment process may comprise closed-loop adjustment processes, wherein the optical system is continuously provided with a feedback signal, in order to optimize the secondary mirror 910 position for optimal performance.

In some embodiments, the feedback signal may be in the form of an optical signal captured by a detector at the image plane or an optical recording medium such as a CMOS sensor within a wavefront sensor. In other embodiments, the feedback signal may be in the form of the output of position sensors that may precisely locate the position of the secondary mirror relative to the rest of the components of the optical system. This may be accomplished using laser interferometric or capacitive position sensors.

In other embodiments, the fine and coarse adjustment processes may comprise an open-loop process, in which position or performance feedback is not provided to the micro-adjustment mechanism in order to optimize the secondary mirror 910 position.

In some embodiments, the coarse adjustment may comprise the additional step of positioning the satellite 900 using an attitude determination and control system (ADCS) such that the optical axis 970 is pointed away from the Earth. The positions of the optical system 905 components are then adjusted until the star field captured by an optical recording is in focus.

In some embodiments, the fine adjustment may comprise positioning the satellite using an ADCS such that the optical axis is directed towards a ground target or known star field. Components of the optical system 905 may be adjusted in position continuously until the magnitude and resolution of the image captured by an optical recording medium is maximized.

Figure 13A:
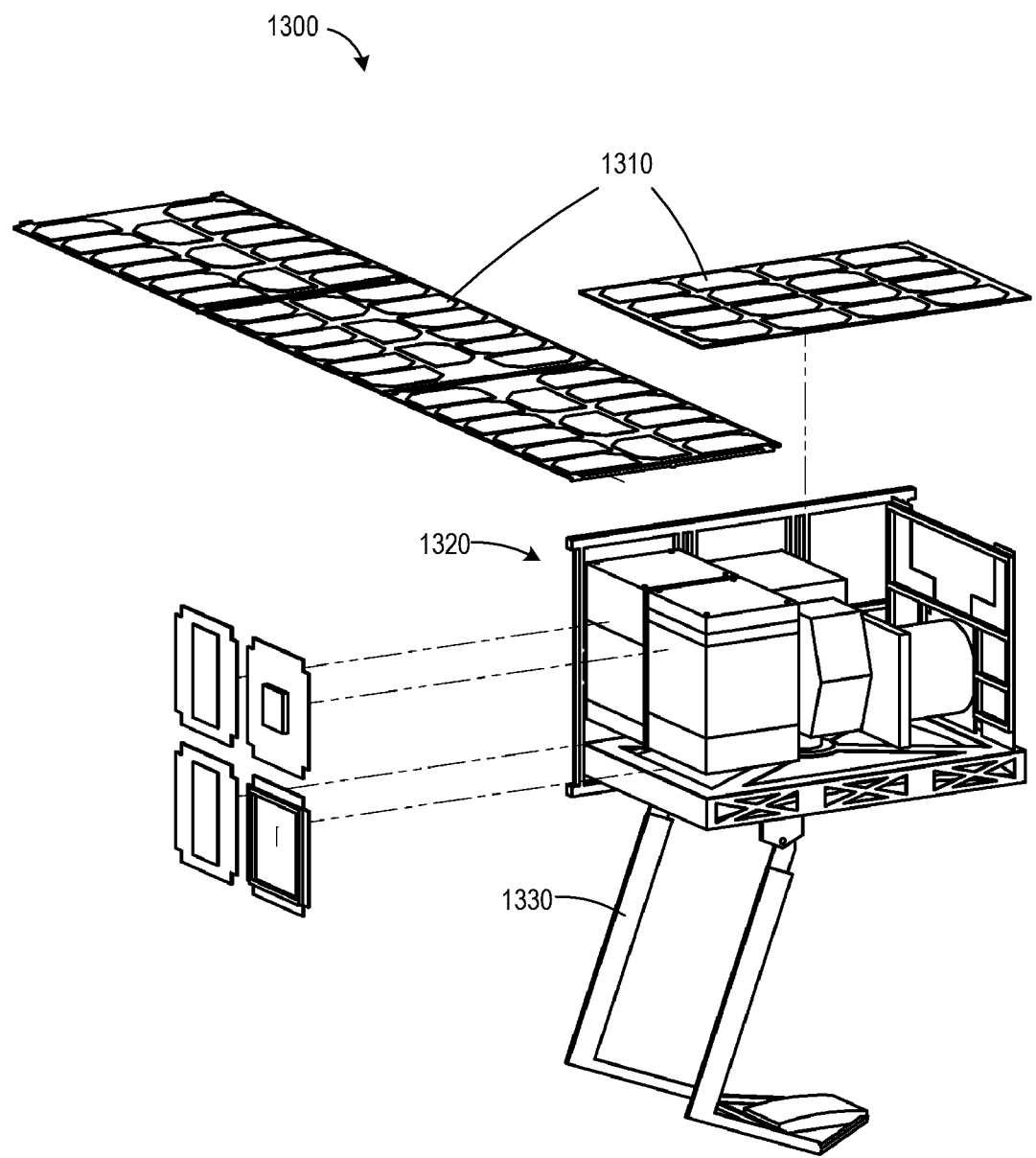
FIGS. 13A, 13B, and 13C illustrates perspective views of the embodiment of FIGS. 9-12 in various configurations, with FIG. 13A showing the satellite deployed with side panels detached, FIG. 13B showing the satellite in a stowed configuration, and FIG. 13C showing the satellite in a deployed configuration.
Figure 13B:
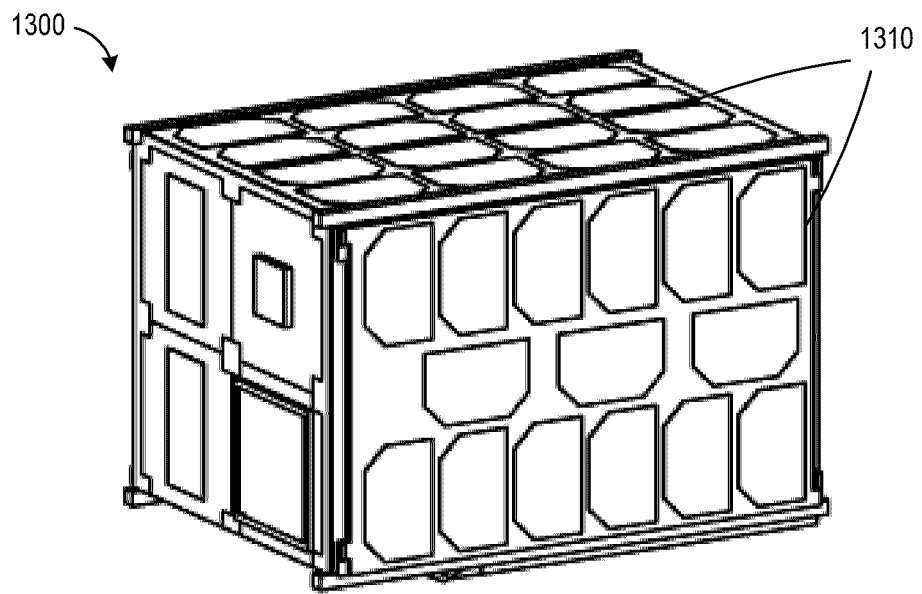
Figure 13C:
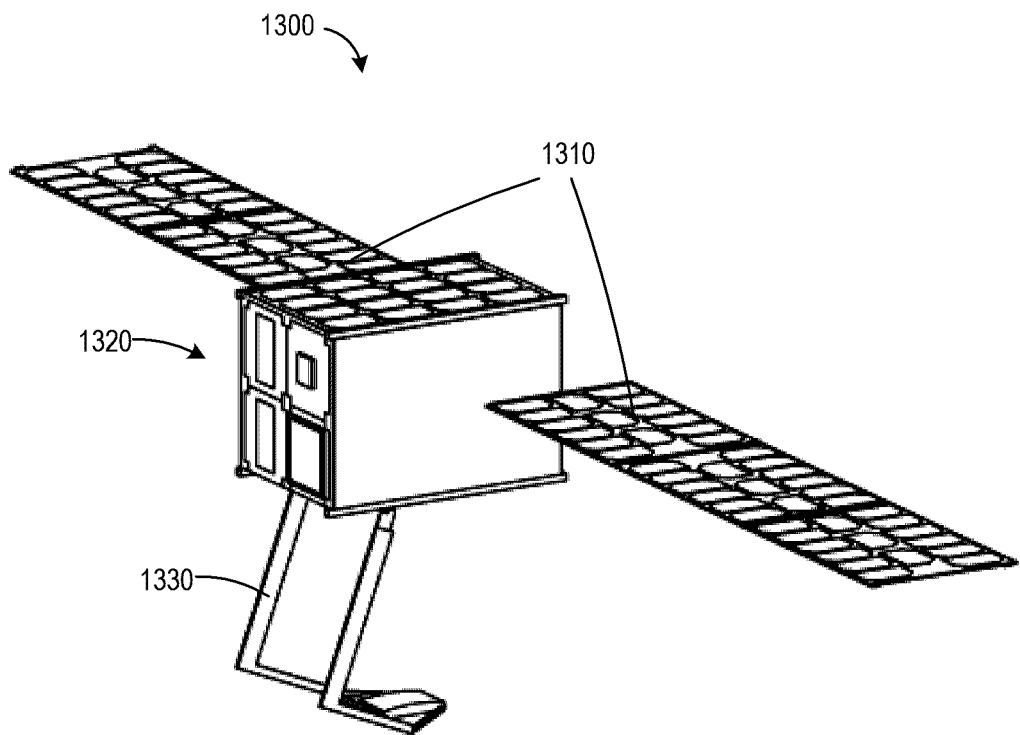

Referring now to FIGS. 13A, 13B, and 13C, shown therein is an embodiment of a satellite 1300 with a deployable optical system. Satellite 1300 may be a 12U version of any of the other satellites described here (e.g., such as satellite 1000, satellite 900, or satellite 200). FIG. 13A shows the satellite 1300 deployed with side solar panels 1310 detached from frame 1320. FIG. 13B shows the satellite 1300 in a stowed configuration, with side solar panels 1310 and secondary mirror arm stowed into frame 1320. FIG. 13C shows the satellite 1300 in a deployed configuration, with side solar panels 1310 and secondary mirror arm 1330 deployed.

Figure 14:
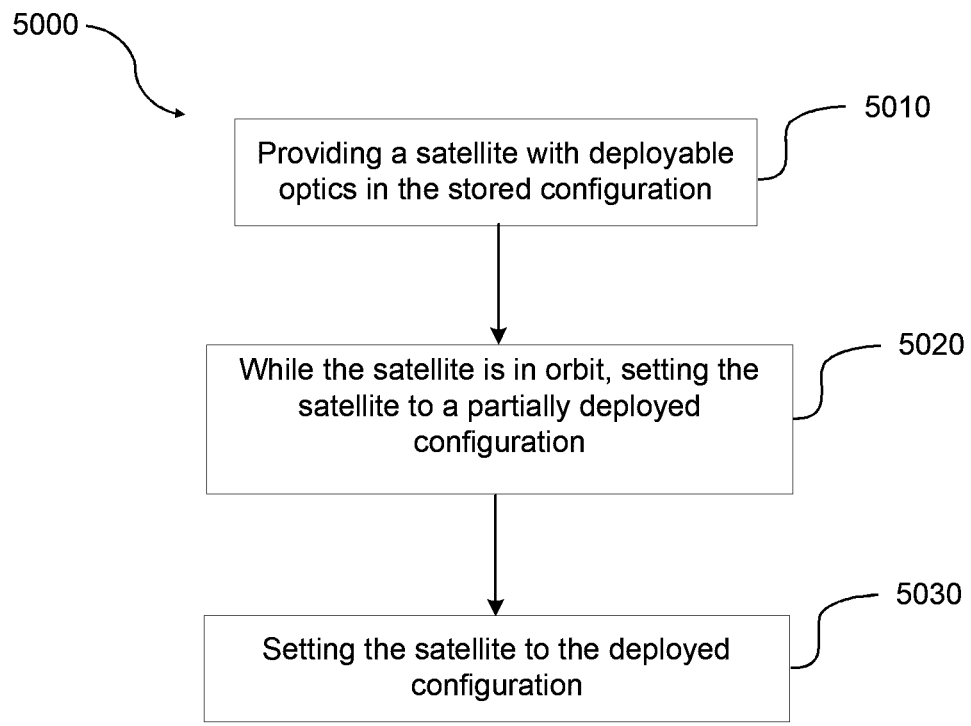
FIG. 14 illustrates a flow chart depicting an alternate method of configuring a satellite with deployable optics.

Referring now to FIG. 14, described therein is a method 5000 of configuring a satellite with deployable optics. In step 5010, a satellite 1000 with deployable optics is provided in the stored configuration.

At least one primary mirror segment 1210 of the satellite 1000 must remain relatively fixed in position. The preferred embodiment of FIGS. 1-2 has two primary mirror segments 1210-1 that are relatively fixed in position. These fixed primary mirror segments 1210-1 generally lie substantially within the volume of the frame 1100.

The optical system 1200 of the satellite 1000 additionally comprises a partially deployed configuration. The satellite 1000 comprises at least one primary mirror 1210-1 that is fixed in position, and at least one secondary mirror 1220 that is deployable, such that its position relative to the frame may be varied.

In step 5020, while the satellite 1000 is in orbit, the satellite 1000 is set to a partially deployed configuration. In the partially deployed configuration, the secondary mirror 1220 is deployed and aligned to the primary mirror segments 1210 (which may be fixed primary petals) to create a functional optical system.

Any method of placing the satellite 1000 into orbit known in the art may be used. For example, the satellite 1000 may be placed onto a commercial launch vehicle, which may launch the satellite 1000 into orbit. In the embodiments wherein the frame 1100 is comprised of multiple CubeSat units, any method known in the art for launching CubeSats may be employed.

In some situations, launching methods may require a timeout period between satellite 1000 launch and satellite power up to reduce risk of damage to the launch vehicle. The satellite 1000 may be configured such that satellite power-up is time delayed from the time of separation from the launch vehicle.

Immediately after separating from the launch vehicle, the satellite 1000 may be travelling at an angular velocity of a magnitude too large to initiate the deployment process. A further waiting period may elapse before the next step, allowing the satellite 1000 to slow to the desired orbiting angular velocity, or below an angular velocity threshold that may allow for deployment of the optical system 1200.

Once the satellite 1000 is in its desired orbit, the method 5000 proceeds to step 5020. The satellite is set to the partially deployed configuration. The initiation of this step may be conducted automatically. For example, after a time delay as required by the launch process, the satellite 1000 may power on. Immediately after powering on, the satellite 1000 may initialize all systems as required for operation of the satellite 1000. Once initialized, the satellite 1000 may begin the partial deployment process of step 5020 without any further external intervention, such as the detection of an external signal.

In other embodiments, step 5020 may be initiated manually. A signal may be sent to the satellite 1000 from ground level. The signal may take the form of an RF signal, optical signal, or any other means known in the art for communicating with an orbiting satellite from ground level. Preferably, this signal takes the form of a UHF or S-Band RF signal for uplinking data, and an S, X, and or Ka band RF signal or optical signal for downlinking data. In embodiments wherein step 5020 is initiated manually, the satellite 1000 receives an initiation signal to initiate the partial deployment process.

In some embodiments, step 5020 may be initiated automatically, with a manual override or backup system. Once deployed into orbit, the satellite 1000 may automatically begin the partial deployment process. If the partial deployment process fails to initiate, step 4020 may be initiated manually. A signal may be sent to the satellite 1000 from ground level. The signal may take the form of an RF signal, optical signal, or any other means known in the art for communicating with an orbiting satellite from ground level. When step 5020 is initiated manually, the satellite 1000 receives an initiation signal to initiate the partial deployment process.

During step 5020, the optical system 1200 may be varied in position. Before step 5020, the optical system 1200 lies substantially within the frame 1100. During step 5020, the optical system 1200 is actuated such that portions of the optical system 1200 lie substantially outside the frame 1100.

In step 5030, the satellite 1000 is set to the deployed configuration. The satellite 1000 may be set to the deployed configuration in a manner described herein, such as in the description of method 3000 or method 4000.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

The invention claimed is:

1. A satellite, comprising:
    a frame comprising:
        a fixed, substantially rectangular cross-section;
        a longitudinal length, extending along a longitudinal axis, substantially perpendicular to the rectangular cross-section, wherein the longitudinal length is larger than the largest dimension of the rectangular cross-section; and
        an optical axis, substantially perpendicular to the longitudinal axis; and
    a deployable optical system, having a mechanical aperture perpendicular to the optical axis, wherein light collected enters the optical system substantially parallel to the optical axis, the deployable optical system having a deployed configuration and a stored configuration wherein:
        in the stored configuration, the optical system remains substantially within the frame; and
        in the deployed configuration, portions of the optical system extend substantially outside the frame,
    the deployable optical system further comprising a primary mirror and a secondary mirror, wherein the primary mirror comprises one or more primary mirror segments and wherein at least one of the one or more primary mirror segments is fixed in position, such that when the satellite is varied between the stored configuration and deployed configuration, a position of the at least one of the one or more primary mirror segments remains constant relative to the frame.

2. The satellite of claim 1, wherein the frame comprises a plurality of CubeSat units.

3. The satellite of claim 2, wherein the light-collecting area of the satellite in the deployed configuration is at least 240 square centimeters.

4. The satellite of claim 2, wherein the ground sample distance of the optical system is at most 3 meters at an optical wavelength of 1100 nm and an orbiting altitude of 550 kilometers.

5. The satellite of claim 1, wherein the satellite may be varied from the stored configuration to the deployed configuration while the satellite is in orbit.

6. The satellite of claim 1, wherein the deployed configuration has a light-collecting area, and the light-collecting area of the deployed configuration is larger than the possible light-collecting area of the stored configuration.

7. The satellite of claim 1, wherein the optical system comprises a catadioptric telescope.

8. The satellite of claim 1, wherein the one or more primary mirror segments further comprise a primary mirror reflecting surface and micro-adjustment mechanism, the micro-adjustment mechanism configured such that the primary mirror reflecting surface may be finely varied in position relative to the frame.

9. The satellite of claim 1, wherein in the stored configuration, the one or more primary mirror segments and the secondary mirror remain substantially within the frame, and in the deployed configuration, at least one of the one or more primary mirror segments is varied in position to extend away from the frame, and the secondary mirror is actuated to extend away from the frame along the length of the optical axis.

10. The satellite of claim 1, wherein the optical system further has a partially deployed configuration, wherein all of the one or more primary mirror segments remain substantially within the frame, and the secondary mirror is actuated to extend away from the frame along the optical axis, wherein the light-collecting area of the satellite in the partially deployed configuration is smaller than the light-collecting area of the satellite in the deployed configuration.

11. The satellite of claim 10, wherein the light-collecting area of the satellite in the partially deployed configuration comprises the area of the one or more primary mirror segments that are fixed in position.

12. The satellite of claim 10, wherein the satellite may be varied from the stored configuration to the partially deployed configuration while the satellite is in orbit.

13. The satellite of claim 1, wherein the primary mirror comprises four primary mirror segments, wherein a first two primary mirror segments are fixed and a second two primary mirror segments are deployable, wherein the deployable mirror segments are coupled to the frame so as to have only one rotational degree of freedom.

14. The satellite of claim 1, wherein the secondary mirror is coupled to the frame such that in the stored configuration, the secondary mirror is retracted behind the mechanical aperture, and in the deployed configuration, the secondary mirror is extended away from the frame along the optical axis.

15. The satellite of claim 14, wherein the secondary mirror further comprises a mirror reflecting surface and can be finely varied in position relative to the frame.

16. A method of configuring a satellite with deployable optics, the satellite comprising:
    a frame comprising:
        a fixed, substantially rectangular cross-section;
        a longitudinal length, extending along a longitudinal axis, substantially perpendicular to the rectangular cross-section, wherein the longitudinal length is larger than the largest dimension of the rectangular cross-section; and an optical axis, substantially perpendicular to the longitudinal axis; and a deployable optical system, having a mechanical aperture perpendicular to the optical axis, wherein light collected travels substantially parallel to the optical axis, the deployable optical system having a deployed configuration and a stored configuration wherein:

in the stored configuration, the optical system remains substantially within the frame; and in the deployed configuration, the optical system extends substantially outside the frame;

the method comprising the steps of:

providing the satellite with deployable optics in the stored configuration;

while the satellite is in orbit, setting the satellite to the deployed configuration;

detecting a deployment malfunction; and setting the satellite to a partially deployed configuration, wherein the optical system partially deploys, such that the optical system has a light-collecting area smaller than the deployed light-collecting area.

17. The method of claim 16, wherein the setting the satellite in the deployed configuration results in a functional optical system with a light-collecting area larger than the possible light-collecting area of the satellite in the stored configuration.

18. The method of claim 16, further comprising:

adjusting a deployed secondary mirror in relation to a primary mirror segment to align the optical system.

19. The method of claim 16, wherein the satellite frame comprises a plurality of CubeSat units.

20. A method of configuring a satellite with deployable optics, the satellite comprising:

a frame comprising:

a fixed, substantially rectangular cross-section;

a longitudinal length, extending along a longitudinal axis, substantially perpendicular to the rectangular cross-section, wherein the longitudinal length is larger than the largest dimension of the rectangular cross-section; and an optical axis, substantially perpendicular to the longitudinal axis; and a deployable optical system, having a mechanical aperture perpendicular to the optical axis, wherein light collected travels substantially parallel to the optical axis, the deployable optical system having a deployed configuration and a stored configuration wherein:

in the stored configuration, the optical system remains substantially within the frame; and in the deployed configuration, the optical system extends substantially outside the frame, wherein the satellite has a deployed light-collecting area;

the optical system having a deployed light-collecting area, and a possible stored light-collecting area smaller than the deployed light-collecting area;

the method comprising the steps of:

providing the satellite with deployable optics in the stored configuration;

while the satellite is in orbit, setting the satellite to a partially deployed configuration, such that a secondary mirror is deployed and aligned to fixed primary petals to create a functioning optical system; and fully deploying the system by deploying additional primary petals, such that the functioning optical system has an increased light-collecting area.

* * * * *